US012572931B2

(12) United States Patent
Tusseau

(10) Patent No.: US 12,572,931 B2
(45) Date of Patent: Mar. 10, 2026

(54) EMBEDDING PRIVACY MEASURES INTO A DISTRIBUTED LEDGER

(71) Applicant: TUSSEAU, Paris (FR)

(72) Inventor: Victoire Anne Tusseau, Neuilly-sur-Seine (FR)

(73) Assignee: TUSSEAU, Paris (FR)

( * ) Notice: Subject to any disclaimer, the term of this patent is extended or adjusted under 35 U.S.C. 154(b) by 105 days.

(21) Appl. No.: 18/653,513

(22) Filed: May 2, 2024

(65) Prior Publication Data

US 2025/0342462 A1 Nov. 6, 2025

(51) Int. Cl.
*G06Q 20/38* (2012.01)
*G06Q 20/02* (2012.01)

(52) U.S. Cl.
CPC ......... *G06Q 20/3829* (2013.01); *G06Q 20/02* (2013.01); *G06Q 20/383* (2013.01)

(58) Field of Classification Search
None
See application file for complete search history.

(56) References Cited

U.S. PATENT DOCUMENTS

| | | | | |
|---|---|---|---|---|
| 2019/0164153 A1* | 5/2019 | Agrawal | .............. | G06Q 20/065 |
| 2020/0280440 A1* | 9/2020 | Bollen | ................. | G06Q 20/382 |
| 2020/0294011 A1* | 9/2020 | Robertson | ............. | H04L 9/3066 |
| 2022/0405750 A1* | 12/2022 | Fallah | ....................... | H04L 9/14 |
| 2023/0121779 A1 | 4/2023 | Quigley et al. | | |

FOREIGN PATENT DOCUMENTS

CN 115619391 A 1/2023

OTHER PUBLICATIONS

Petar Stoykov, "Stealth Addresses: Decrypting blockchain transaction privacy", Feb. 7, 2024 (Year: 2024).*
International Search Report and Written Opinion received for PCT Patent Application No. PCT/IB2024/054330, mailed on Jan. 15, 2025, 15 pages.
Odoom et al., "A Privacy-preserving Covid-19 Updatable Test Result and Vaccination Provenance based on Blockchain and Smart contract", 2019 International Conference on Mechatronics, Remote Sensing, Information Systems and Industrial Information Technologies, 2019, 6 Pages.

* cited by examiner

*Primary Examiner* — Patrick Mcatee
*Assistant Examiner* — Timothy Paul Sax
(74) *Attorney, Agent, or Firm* — Workman Nydegger

(57) ABSTRACT

Techniques for enhancing privacy measures in a blockchain are disclosed. A service generates a smart contract for an asset. The smart contract includes a storage space having a public address field comprising a first public address value. The first public address value is associated with a first private key that is usable to generate a proof of ownership of the asset. The service deploys the smart contract to the blockchain. The service generates a second private key. The service uses the second private key to generate a second public address value. Despite a current owner of the asset not changing such that no transactions involving the asset are performed, the service transmits the second public address value to the smart contract to trigger the smart contract to replace the first public address value in the public address field with the second public address value.

20 Claims, 14 Drawing Sheets

Asset Address
105
Transaction Details
110
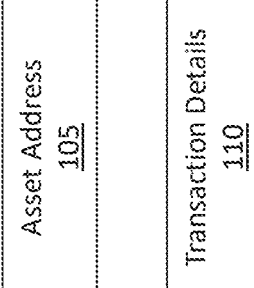
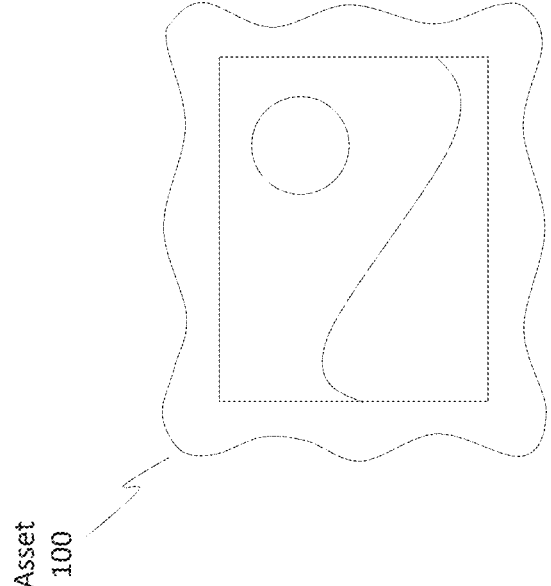
Asset
100
*Figure 1*

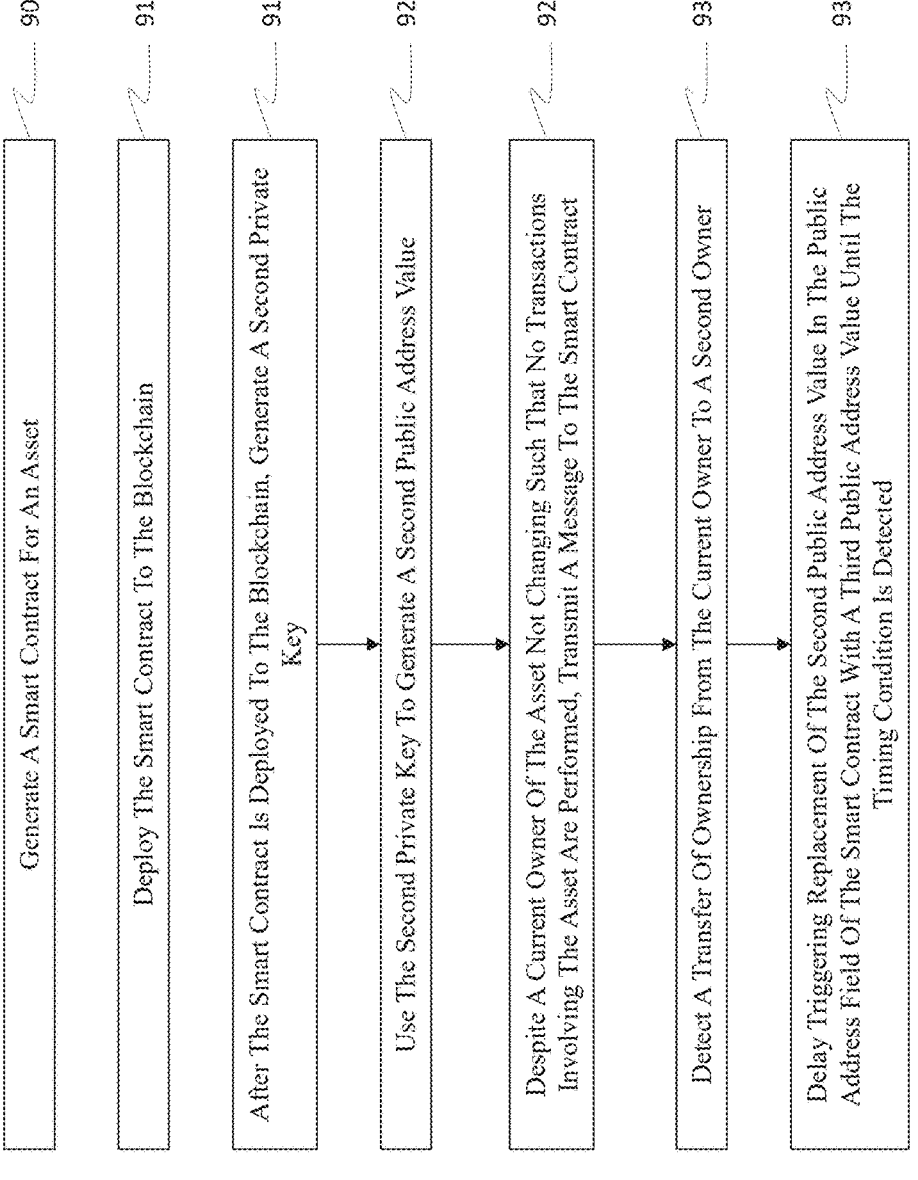

900

905 — Generate A Smart Contract For An Asset

910 — Deploy The Smart Contract To The Blockchain

915 — After The Smart Contract Is Deployed To The Blockchain, Generate A Second Private Key 920 — Use The Second Private Key To Generate A Second Public Address Value 925 — Despite A Current Owner Of The Asset Not Changing Such That No Transactions Involving The Asset Are Performed, Transmit A Message To The Smart Contract 930 — Detect A Transfer Of Ownership From The Current Owner To A Second Owner 935 — Delay Triggering Replacement Of The Second Public Address Value In The Public Address Field Of The Smart Contract With A Third Public Address Value Until The Timing Condition Is Detected

*Figure 9*

EMBEDDING PRIVACY MEASURES INTO A DISTRIBUTED LEDGER

BACKGROUND

A "distributed ledger" refers to a type of non-centralized database. This database is shared among multiple nodes and requires consensus and synchronization among those nodes. The records stored in the database are made publicly available. As a result, the records (aka "transactions") are publicly witnessed by the various nodes. When a change is made to the database, that change is propagated to the other nodes and is reflected in the copy of the database at those other nodes.

A distributed ledger provides various security advantages over traditional centralized ledgers or centralized databases. For instance, a distributed ledger is much harder to attack by a malicious entity because the malicious entity would have to simultaneously attack every copy of the distributed ledger across the various nodes. Also, distributed ledgers are much more resistant to improper changes made by a single malicious entity. These enhanced protections of the distributed ledger arise because of the distributed nature of the ledger and because of the public transparency provided by the distributed ledger.

One example of a distributed ledger is a "blockchain." The blockchain is a type of distributed database that includes a list of continually growing records; these records are referred to as "blocks." The blockchain links these blocks together (e.g., into a "chain" of blocks) using a cryptographic technique. To illustrate, each block in the blockchain includes a cryptographic hash of the immediately preceding block in the chain. Each block also includes timestamp data as to when the transaction associated with the block was performed and further includes transaction data. These blocks are recorded in all of the nodes hosting the blockchain. As a result, the record included in the block cannot be altered retroactively unless all of the nodes come to a consensus on the change, which is doubtful, and unless all of the subsequent blocks reflect that change. Thus, retroactive changes are, for the most part, impossible. In this manner, the blockchain is an append-only type of distributed database system.

Thus, the blockchain is a system that stores immutable data in a publicly transparent manner. To use the blockchain, one must possess a "private key" and a "public address" (sometimes also referred to as a "public key"). Typically, the private key and the public address are unique alphanumeric sequences. The private key and the public address are also linked to one another. For instance, a private key allows a system to generate a public address. The private key is typically kept secret, but the public address is typically made public.

A "smart contract" can be uploaded to the blockchain. A smart contract includes logic that is stored on the blockchain and that is automatically executed when certain conditions, as specified by the logic, are met. The smart contract governs the performance of a transaction.

A smart contract is created via a coding process that is implemented outside of the blockchain. After the smart contract is coded, the smart contract will subsequently be deployed to the blockchain where it will then be executable. A smart contract is identified on the blockchain by a sequence of numbers and letters. This sequence of numbers and letters is referred to as the "contract number" for the smart contract. Everything displayed on a smart contract in the blockchain is publicly visible.

A smart contract includes a storage space and a tools space. The storage space is coded and created by the creator of the smart contract. The storage space can store specific types of data, which are typically defined during the smart contract's coding process.

Similarly, the tools space is also coded and created by the creator. Each smart contract may include a unique set of tools (i.e. logic) for performing specific actions in response to certain conditions being met. The tools in the tools space can execute on data stored in the storage space (i.e. the smart contract's own storage data) or on other data stored in the blockchain.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for enhancing privacy measures for ownership data associated with an asset that is managed by a smart contract residing in a blockchain, said method being implemented by a service and including: generating a smart contract for an asset, wherein: the smart contract is structured to include a storage space that will be publicly visible when the smart contract resides in a blockchain, the storage space is structured to include a public address field including a first public address value, and the first public address value is associated with a first private key that is usable to generate a proof of ownership of the asset, deploying the smart contract to the blockchain; after the smart contract is deployed to the blockchain, generating a second private key; using the second private key to generate a second public address value; and despite a current owner of the asset not changing such that no transactions involving the asset are performed, transmitting a message to the smart contract, wherein said transmitting operates as a trigger to cause the smart contract to replace the first public address value in the public address field with the second public address value.

In some aspects, the techniques described herein relate to a computer system including: a processor system; and a storage system including instructions that are executable by the processor system to cause the computer system to: generate a smart contract for an asset, wherein: the smart contract is structured to include a storage space that will be publicly visible when the smart contract resides in a blockchain, the storage space is structured to include a public address field including a first public address value, and the first public address value is associated with a first private key that is usable to generate a proof of ownership of the asset, deploying the smart contract to the blockchain; after the smart contract is deployed to the blockchain, generate a second private key; use the second private key to generate a second public address value; and despite a current owner of the asset not changing such that no transactions involving the asset are performed, transmit a message to the smart contract, wherein said transmitting operates as a trigger to cause the smart contract to replace the first public address value in the public address field with the second public address value.

In some aspects, the techniques described herein relate to a method for enhancing privacy measures for ownership data associated with an asset that is managed by a smart contract residing in a blockchain, said method being implemented by a service and including: generating a smart contract for an asset, wherein: the smart contract is structured to include a storage space that will be publicly visible when the smart contract resides in a blockchain, the storage space is structured to include a public address field including a first public address value, and the first public address value is associated with a first private key that is usable to generate a proof of ownership of the asset, deploying the smart contract to the blockchain; after the smart contract is deployed to the blockchain, generating a second private key, wherein new private keys, including the second private key, are generated in response to occurrence of a timing condition; using the second private key to generate a second public address value; despite a current owner of the asset not changing such that no transactions involving the asset are performed, transmitting a message to the smart contract, wherein said transmitting operates as a trigger to cause the smart contract to replace the first public address value in the public address field with the second public address value; detecting a transfer of ownership from the current owner to a second owner, wherein the transfer of ownership occurs after the first public address value is replaced by the second public address value; and delaying triggering replacement of the second public address value in the public address field of the smart contract with a third public address value until the timing condition is detected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates an example of an asset.

FIG. 9 illustrates a flowchart of an example method for enhancing security measures in the blockchain.

DETAILED DESCRIPTION

Figure 2:
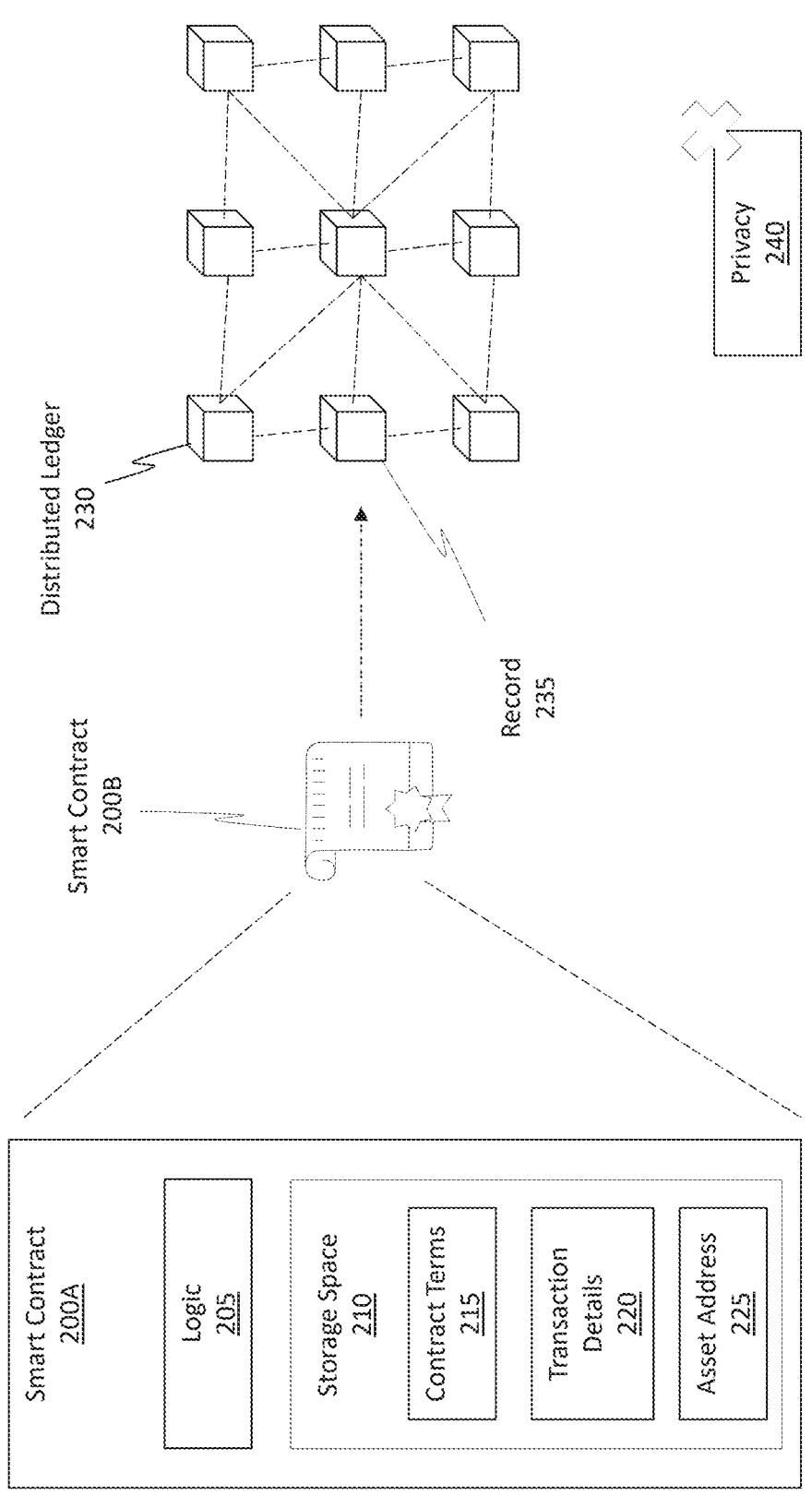
FIG. 2 illustrates an example of a smart contract.

Today, countless transactions of various types take place every day on distributed ledgers, such as the blockchain. It should be noted how a majority of this disclosure references the blockchain, but any type of distributed ledger may be used. Similarly, any type of blockchain (e.g., Bitcoin, Ethereum, etc.) can be used. Accordingly, reference to the blockchain should be viewed as a reference to any type of distributed ledger.

It should also be noted how this disclosure uses terms such as "message," "transaction," "seal," "cryptographic function" (or simply "function"), "tool," and various other terms. The terms used herein should be interpreted broadly as being applicable to any type of blockchain, without limit, even if different blockchains use different nomenclature. As various examples, reference to a "message" can refer to a "transaction" in the blockchain, such as on the Ethereum blockchain. Reference to a "seal" can refer to a "cryptographic signature" in the blockchain. Reference to a "tool" can refer to a "function" in the blockchain.

As another example, if a message is sealed, it means on Ethereum that a transaction is signed. Accordingly, use of these various terms should be viewed in a broad sense and should be viewed as being applicable regardless of which specific type of blockchain is being used.

Due to the public nature of the blockchain, transactions on the blockchain are exposed to multiple issues with respect to the privacy of individuals involved in those transactions. For instance, one issue is that everyone can see when a transaction involving an asset occurred. Another issue is that it is possible to identify the owner of the asset by inspecting the address that is recorded in the smart contract stored in the blockchain. For instance, the owner's address may be recorded in multiple areas of the blockchain to show ownership for multiple different assets. By aggregating this data, it is possible to infer the identity of the owner.

The disclosed embodiments bring about numerous benefits, advantages, improvements, and practical applications to data privacy, particularly for data stored in the blockchain. As one benefit, the disclosed embodiments are able to hide, conceal, or otherwise obfuscate the date of a transaction that is memorialized in the blockchain. By hiding the date of the transaction, the embodiments are able to prevent the date of the transaction from being known publicly, thereby increasing privacy for the owner who facilitated the transaction.

As another benefit, the embodiments are able to anonymize the owner of an asset, including subsequent purchasers/owners of the asset. By anonymizing information about the owner, the embodiments are able to prevent personal information of the owner from being known publicly. As a result, the disclosed embodiments are beneficially able to provide privacy measures in the blockchain, which is specifically designed to avoid privacy by making the data in the blockchain publicly available.

As yet another benefit, the embodiments are able to authenticate an asset, regardless of whether it is a digital asset or a physical asset, in an indisputable manner. For instance, the embodiments are structured to enable an owner of an asset to prove to any entity that the owner is indeed the rightful owner of the asset. Stated differently, the embodiments are able to provide provenance details for an asset. Accordingly, these and numerous other benefits will now be described in more detail throughout the remaining sections of this disclosure.

Attention will now be directed to FIG. 1, which illustrates an example asset 100. Asset 100 may be of any type, without limit. For instance, asset 100 may be a physical asset, such as perhaps a painting, or a digital asset, such as perhaps an image. Typically, the asset 100 will be associated with a marker or code, as indicated by the asset address 105 (e.g., perhaps the asset address 105 is etched onto the asset 100). When the asset 100 is created or purchased, details of that event can be memorialized in the transaction details 110. As mentioned previously, the blockchain is now being used to record transactions related to assets. Further details are provided in FIG. 2.

For instance, when the asset 100 of FIG. 1 is involved in a transaction, the details of that transaction can be recorded in the blockchain, as shown in FIG. 2. FIG. 2 shows an example smart contract 200A and 200B that can be used to memorialize the details of the asset's transaction.

Smart contract 200A is shown as including logic 205, which corresponds to the tools space mentioned earlier. Logic 205 includes code that can be triggered for execution when one or more conditions are satisfied. In some instances, those conditions (or data for those conditions) are specified in the storage space 210 of the smart contract 200A. For instance, the storage space 210 includes various contract terms 215, which may recite the terms of the conditions for when the logic 205 is implemented. Storage space 210 is also shown as including transaction details 220, which correspond to the transaction details 110 of FIG. 1. Storage space 210 can also include the asset address 225, which corresponds to the asset address 105 of FIG. 1.

The smart contract 200A/B is deployed into a distributed ledger 230 in the form of a block or a record 235. As mentioned previously, one of the issues with storing information in the blockchain is that this information is publicly available such that privacy 240 is not available for that information, as shown by the large X over privacy 240. The disclosed embodiments are structured to enhance privacy measures for transactions in the blockchain, as shown in FIG. 3.

Figure 3:
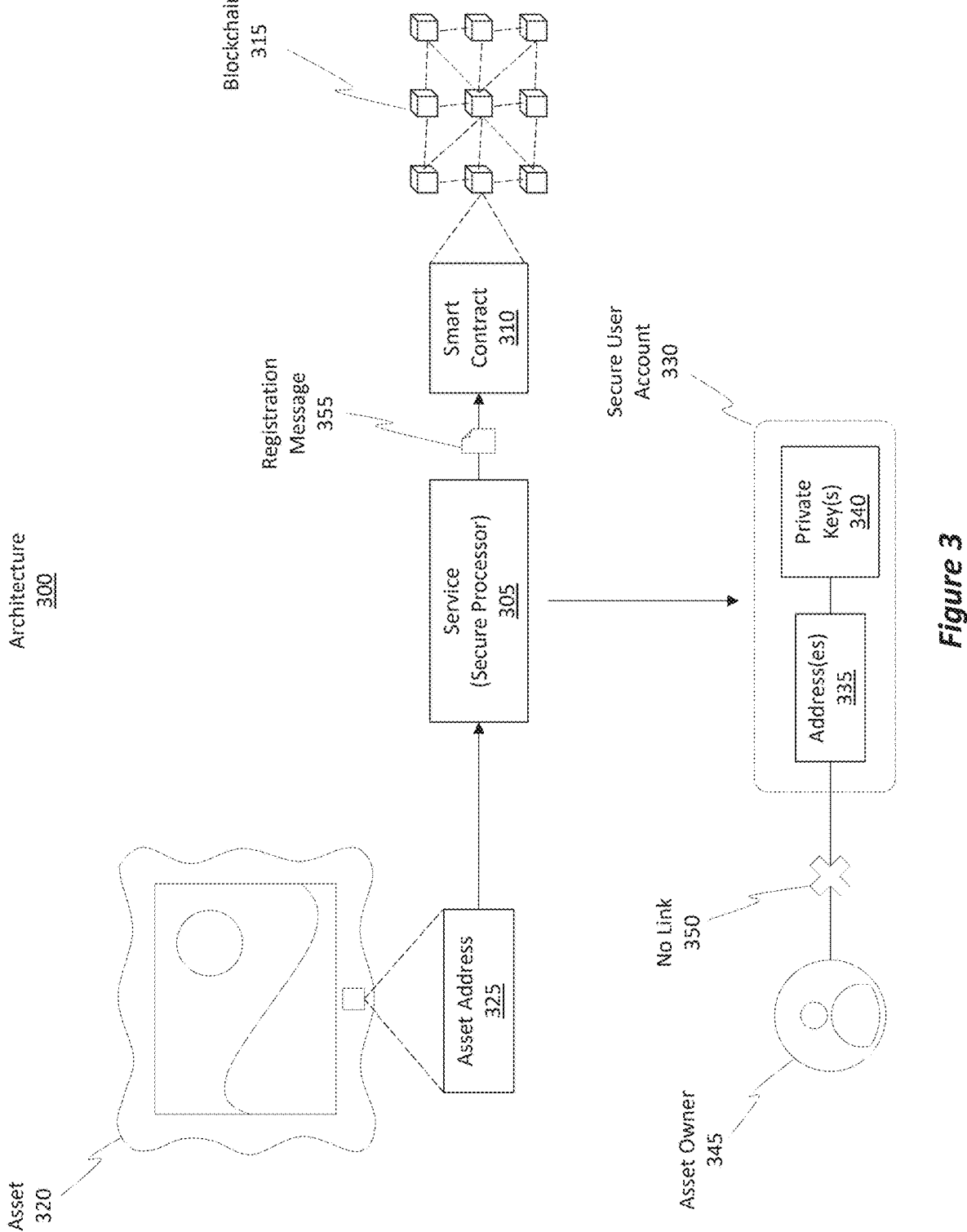
FIG. 3 illustrates an example computing architecture that can enhance privacy measures in the blockchain.

FIG. 3 shows an example computing architecture 300 in which the disclosed principles and embodiments may be employed. FIG. 3 shows an example service 305 (e.g., a secure processor).

As used herein, the term "service" refers to an automated program that is tasked with performing different actions based on input. In some cases, service 305 can be a deterministic service that operates fully given a set of inputs and without a randomization factor. In other cases, service 305 can be or can include a machine learning (ML) or artificial intelligence engine. The ML engine enables service 305 to operate even when faced with a randomization factor.

As used herein, reference to any type of machine learning or artificial intelligence may include any type of machine learning algorithm or device, convolutional neural network (s), multilayer neural network(s), recursive neural network (s), deep neural network(s), decision tree model(s) (e.g., decision trees, random forests, and gradient boosted trees)

linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 305 is a cloud service operating in a cloud environment. In some cases, service 305 is a local service operating on a local device. In some implementations, service 305 is a hybrid service that includes a cloud component operating in the cloud and a local component operating on a local device. These two components can communicate with one another.

Service 305 is generally tasked with facilitating the development and deployment of a smart contract 310 into the blockchain 315. As will be described in more detail shortly, smart contract 310 is unique as compared to the smart contract 200A of FIG. 2 in that the smart contract 310 is able to obscure the timing details for a transaction associated with an asset and is further able to obscure the personal information of the owner of the asset.

FIG. 3 shows one example of an asset 320. As mentioned, asset 320 may be of any type. In accordance with the disclosed principles, asset 320 is caused to be associated with an unchanging asset address 325. As one example, consider a scenario where asset 320 is a painting. The asset address 325 in this scenario can be a sequence of symbols that are included as a part of the painting. For instance, the symbols can be permanently affixed to the painting in some manner, such as via ink or etching. The asset address 325 represents a unique identification code for the asset 320. That is, the asset address 325 is directly linked with the asset 320 and may be used to distinctly identify the asset 320. The asset address 325 is associated only with the asset and is not associated with the creator of the asset, the owner of the asset, or a manager for the asset.

The asset address 325 is then provided to the service 305. Notably, the asset address 325 is provided to the service 305 prior in time to the asset 320 being subjected to a transaction, such as a purchase. Service 305 then configures the smart contract 310 to include the asset address 325. Service 305 then deploys the smart contract 310 to the blockchain 315. The blockchain 315 will then have a record of the asset 320 via the asset address 325. To be clear, the asset address 325 is stored in the storage space of the smart contract 310, and the smart contract 310 is deployed to the blockchain 315. At this point, no personal information of an owner is available because only the asset address 325 is known. Also, the asset 320 has not yet been purchased, so there has not been a transfer of ownership to record. In some scenarios, the permanent asset address etching can also be performed after the smart contract is deployed.

Figure 4:
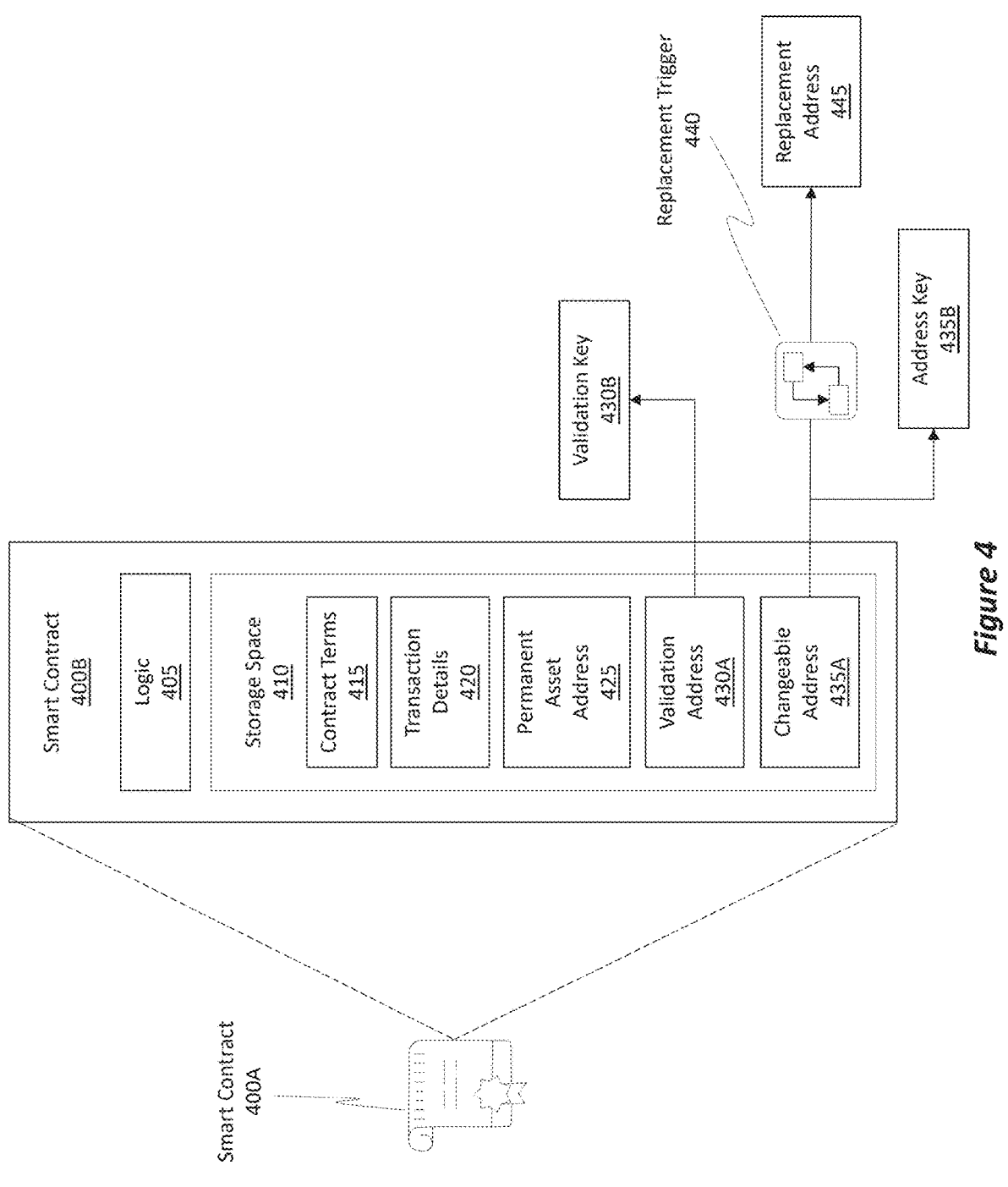
FIG. 4 illustrates an improved smart contract.

As mentioned previously, smart contract 310 is configured in a new and unique manner. FIG. 4 provides some additional details.

FIG. 4 shows an example smart contract 400A and 400B that is representative of the smart contract 310 of FIG. 3. Smart contract 400B is shown as including logic 405 (e.g., the tools mentioned previously) and storage space 410. The storage space 410 includes contract terms 415, transaction details 420, and the permanent asset address 425, which is representative of the asset address 325 of FIG. 3. The permanent asset address 425 will not change (hence being "permanent"). Smart contract 200A of FIG. 2 was configured in a similar manner. In some implementations, the permanent asset address 425 can be unique on the blockchain. For example, the permanent asset address 425 can be a specific public address for this particular asset.

Smart contract 400B of FIG. 4, however, is now configured to include additional features and information that was not included in the smart contract 200A of FIG. 2. For instance, smart contract 400B now includes a validation address 430A and a changeable address 435A.

The validation address 430A refers to an address of the creator of the asset. For instance, if the asset is a painting, the creator of the asset would be the painter of the painting. The validation address 430A is a unique address that identifies the asset creator. This validation address 430A may include any sequence of symbols used to distinctly identify the asset creator. This sequence of symbols will be used by the creator to indicate that he/she is the creator of the asset as well as any other assets the creator has created. By using this validation address 430A, a subsequent owner of the asset or any other interested entity can be certain that the asset is authentic and is claimed by the creator because the validation address is associated with that asset and all other assets by that same creator. One or more validation addresses can optionally be associated with the asset creator, and one or more validation addresses can be registered on the smart contract 400B that is linked to an asset produced or created by this asset creator.

The validation address 430A is known to the public. The validation address 430A is also associated with a private validation key 430B. The validation key 430B can be used to authenticate the validation address 430A and to prove that the asset is associated with a particular asset creator.

In this regard, the validation address 430A and the validation key 430B are linked to a particular asset creator. The validation address 430A and the validation key 430B do not necessarily belong to the creator; rather, they represent the asset, or rather the asset's origination authenticity, by certifying, attesting, or ensuring that the asset was in fact created by the creator. The creator acknowledges this creation is his/her own through the presence of the validation address 430A on the smart contract 400B. In this regard, the validation address 430A serves as a "validation" of the asset's authenticity. In some implementations, the validation key is used to sign at least one message to the smart contract 310 (e.g., to validate the asset's authenticity). This message can be any type of message, including, but not limited to, a smart contract deployment message, a registration message, a modification message, or any tool message.

In accordance with the disclosed principles, no validation address is registered in the storage space 410 of the smart contract 400B without a number of conditions being met. One condition is that the creator must consent. Without the acknowledgement and recognition of the asset in question by the creator, there can be no registration of the validation address 430A. Another condition is that there must be absolute certainty regarding the creator's identity. For instance, if service 305 of FIG. 3 is not positively and unequivocally certain of the creator's identity through any possible and conceivable proof, service 305 will not permit the registration of the validation address 430A.

It should also be noted how the validation address 430A remains constant such that it does not change. By remaining constant, the validation address 430A allows any entity to verify at any time that this validation address is the same on all smart contracts for assets claimed to be from the creator. The embodiments can also verify the signature of at least one message to the smart contract 310 via the validation address 430A. This ensures that all of those assets are authentic, not counterfeit, and are attributed to the same author. In other words, the unchangeability of the validation address and its verification of the signature of at least one message to the smart contract 310 allows one to verify that each asset whose validation address is checked was indeed created by the claimed creator and thus is not counterfeit.

In some implementations, the validation key 430B is not disclosed to the creator. For instance, the disclosed embodiments allow a creator to confirm and to prove to anyone questioning their creatorship that the creator is indeed the creator of the asset. Service 305 of FIG. 3 is able to provide an account for the creator. Service 305 is further able to provide a tool in that account. This tool generates a proof of original conception. This proof of original conception enables the creator to prove to anyone that the creator is indeed the authentic creator of the asset.

Service 305 provides an option for the creator to generate a proof of original conception, and the creator may be provided knowledge of the validation address 430A. Being aware of the validation address 430A allows the creator to verify that all of his/her assets endowed with the validation address 430A are recognized as being created by the creator. For instance, having knowledge of the validation address 430A, a creator can visit a smart contract associated with one of his/her assets. The creator can check to determine if the validation address on the smart contract is associated with the validation address associated with the creator to thereby determine authenticity.

In FIG. 4, smart contract 400B is also shown as including the changeable address 435A. Whereas the permanent asset address 435A and the validation address 430A remain constant, the changeable address 435A does change. Changing this address enables the embodiments to obscure the transaction timing information for an asset and other transaction details of the asset.

Traditionally, a transaction of an asset is recorded in the blockchain through a sales contract involving a smart contract. A standard smart contract includes the smart contract number, which refers to the asset involved in the transaction. The standard smart contract also includes a public address, which is linked to a private key. Only the owner of the asset knows this private key. As long as the asset's owner remains the same, the public address presented on the smart contract will also remain the same. When the owner of the asset changes, the public address presented on the smart contract changes and is replaced by the public address associated with the private key of the new owner. Everyone can see the information displayed on the smart contract. As a result, everyone can see that a public address on the smart contract has changed, which indicates that a transaction has occurred. Thus, everyone can see when a transaction of an object took place from one owner to another.

The changeable address 435A facilitates the ability to obscure or obfuscate the timing with respect to a transaction. Unlike a traditional smart contract where the public address presented on the smart contract remains the same as long as the asset's owner remains the same, the changeable address 435A in the disclosed smart contract 400B is configured to change at either a periodic interval or an aperiodic interval, even though ownership of the asset remains constant. That is, this change occurs even if the owner of the asset remains the same. Notably, the changeable address 435A is directly linked to the asset and not to any specific owner of the asset.

Thus, the disclosed embodiments purposely change the changeable address 435A in response to a replacement trigger 440 (e.g., often a timing trigger), resulting in the old changeable address 435A being replaced with a replacement address 445. Later, this new address will also be replaced, and that new address will also subsequently be replaced. Similarly, the address key 435B associated with the changeable address 435A will be changed and updated each time a new address is used.

Because everyone can see the information displayed in the smart contract 400B, everyone can also see that the changeable address 435A is also periodically or aperiodically changing. A significant disadvantage of traditional smart contracts is that anyone can deduce transaction timing details for an asset. The disclosed embodiments beneficially configure a new type of smart contract to fix that issue. Thus, because of the changing nature of the changeable address 435A, no one can now discern when a transaction for an asset takes place. As a result, no one can determine whether a transaction for the asset has happened. The changing nature of the changeable address 435A also operates to obscure who owns the asset.

It should be noted how an asset may have one or more changeable addresses. Similarly, the asset may have one or more permanent asset addresses. A smart contract can be linked or can represent one or more assets. One or more smart contracts can perform the function of smart contract 400B and smart contract 310, such as by operating in a coordinated manner.

Figure 5A:
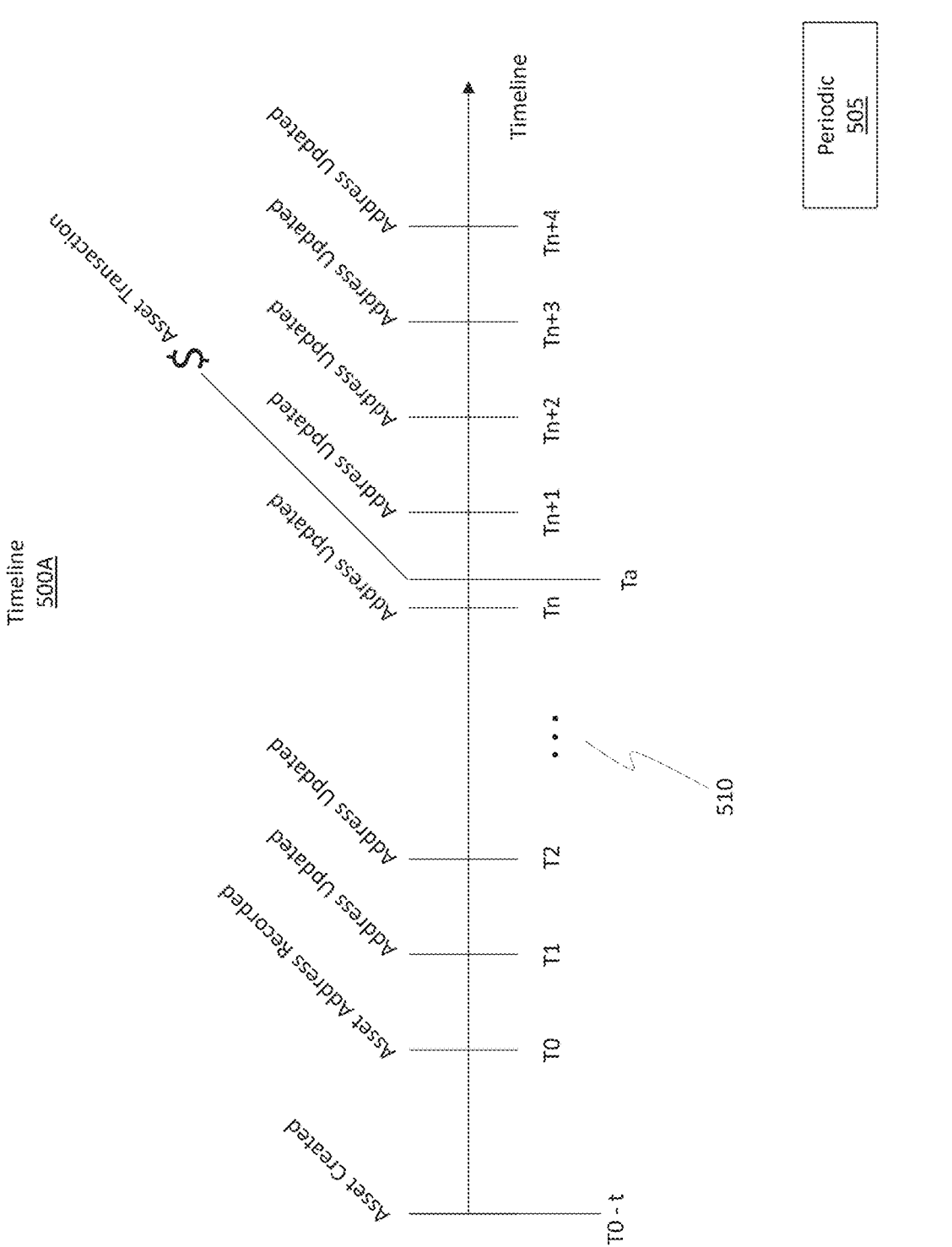
FIGS. 5A, 5B, and 5C illustrate example timelines showing how a changeable address in the smart contract can be updated.

The replacement trigger 440 for determining when and if the changeable address 435A should be changed can be based on one or more parameters. For instance, in one example scenario, the replacement trigger 440 can be a set period of time at which the address is to change. This period can be set to any value. As various examples, the period can be set to every new hour, every select number of hours, every day, every week, or perhaps every month. Smaller or larger periods can be used as well, without limit. FIG. 5A provides some additional details.

FIG. 5A shows an example timeline 500A representative of a periodic 505 scenario in which the changeable address 435A is changed at a pre-set period or frequency. FIG. 5A shows a time T0-t where the asset is created. At time T0, the asset address is recorded in the blockchain using the service 305, which deploys the smart contract 310 to the blockchain 315, resulting in the asset address being uploaded to the blockchain. With this deployment, the smart contract 310 is also populated using a first changeable address. In some implementations, the first changeable address can be the same as the asset address. In other implementations, the first changeable address may be selected from a group of pre-composed addresses. In some implementations, the first changeable address is a randomly generated address.

In accordance with whatever period is predefined in this example scenario (e.g., perhaps the period is one hour), at time T1, service 305 triggers the modification tool to change the changeable address, resulting in a new address being recorded in the smart contract 310. At time T2, another update occurs. These updates may occur for any duration of time, as represented by the ellipsis 510. The replacement of addresses can occur at periodic intervals. In some scenarios, the generation of keys associated with these addresses can happen at any time as long as the addresses are not present on the smart contract.

At time Tn, the address is again updated in accordance with the defined period. After time Tn, at time Ta, the asset is subjected to a new transaction in which a new owner purchases the asset. Notably, in accordance with the embodiment presented in FIG. 5, the changeable address is not immediately changed in response to this new transaction. Instead, the changeable address is changed at the next periodic event, as shown by time Tn+1. At that point in time, the changeable address is updated. Notably, the changeable address is not updated to include the address of the new purchaser; rather, the changeable address is updated to reflect a new address that is linked to the asset, as were the previously recorded addresses. The new owner's account profile (to be discussed in detail later) will reflect the new address as well as the new private key associated with that new address. Further details on this account profile will be provided later.

Subsequently, at times Tn+2, Tn+3, and Tn+4, the changeable address is updated even though the asset is not subjected to any new transactions. By changing the changeable address in this manner, the embodiments are able to hide or obscure when the asset transaction took place and who owns the asset.

Figure 5B:
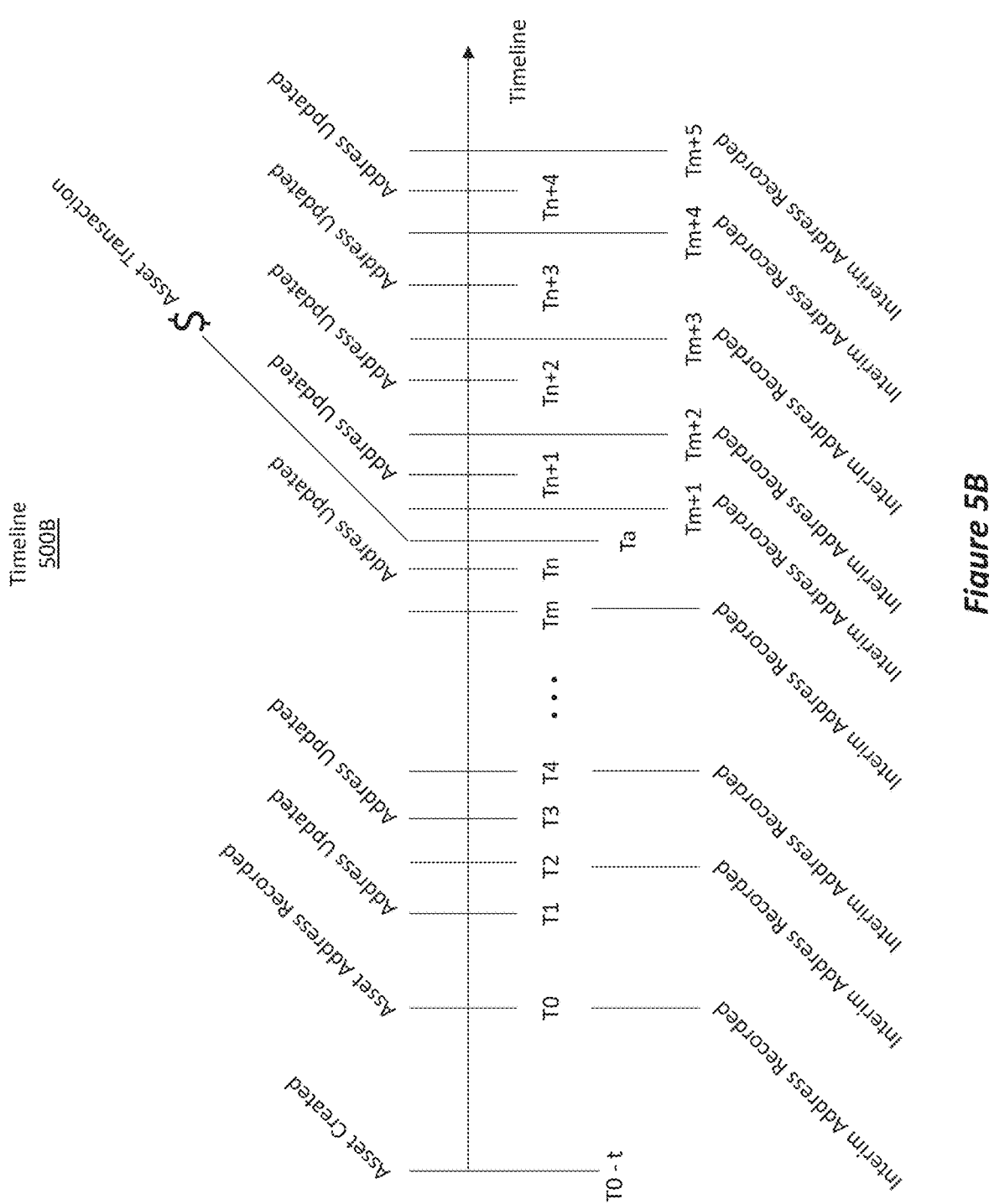

FIG. 5B shows a similar scenario (timeline 500B) now involving the recordation of an interim address. For instance, an interim address is shown as being recorded at times T0, T2, T4, Tm, Tm+1, Tm+2, Tm+3, Tm+4, and Tm+5. Further details on the interim address will be provided momentarily.

Figure 5C:
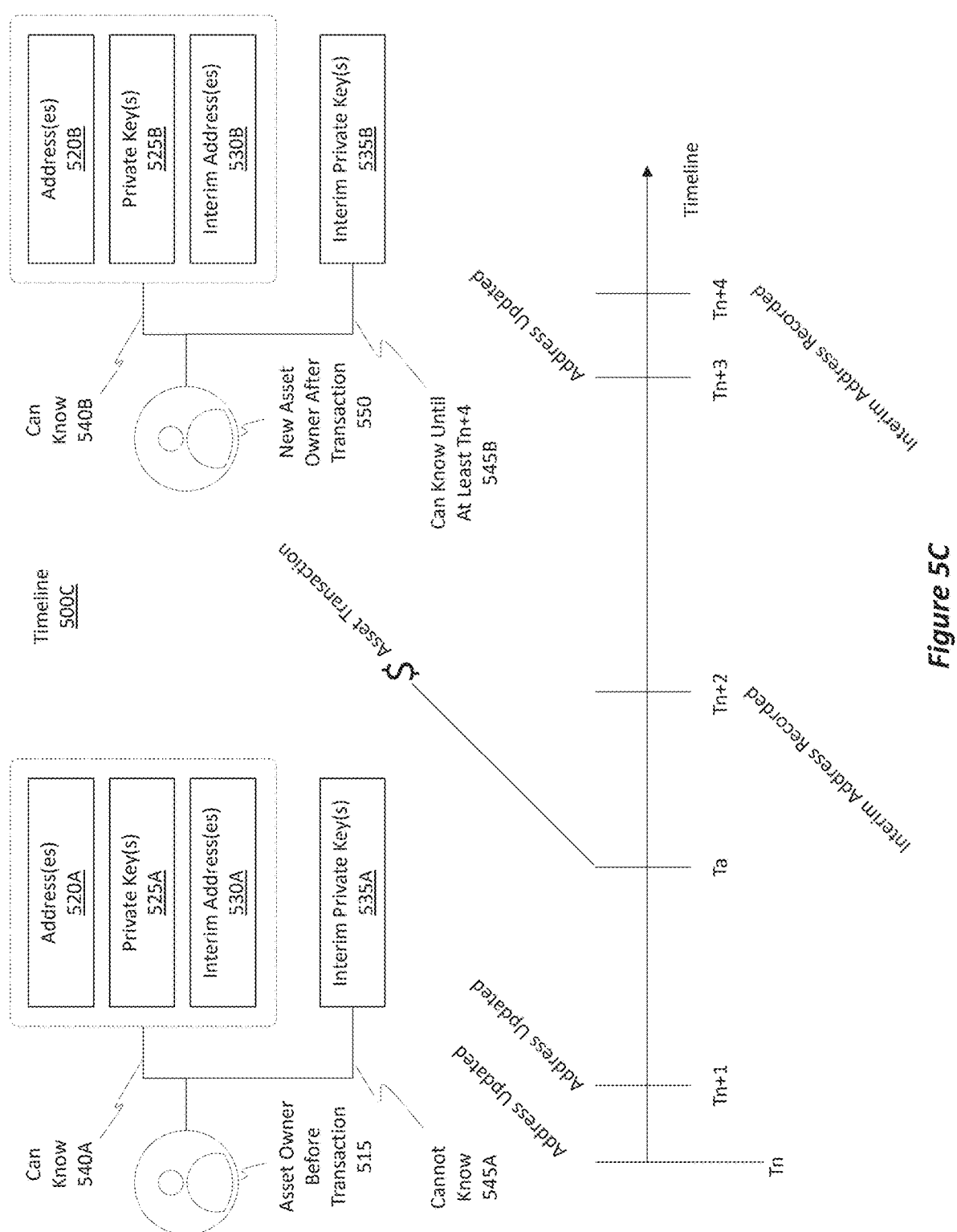

FIG. 5C shows another example timeline 500C involving various different interim addresses. In particular, FIG. 5C shows an asset owner before transaction 515 (e.g., transaction at time Ta). FIG. 5C also shows address(es) 520A (corresponding to addresses 335 from FIG. 3), private key(s) 525A (corresponding to private key(s) 340), interim address (es) 530A, and interim private key(s) 525A. The asset owner before transaction 515 can know 540A the address(es) 520A, private key(s) 525A, and the interim address(es) 530A. The asset owner before transaction 515 cannot know 545A the interim private key(s) 535A.

FIG. 5C shows a new asset owner after transaction 550 (e.g., transaction at time Ta). FIG. 5C shows address(es) 520B (corresponding to address(es) 520A), private key(s) 525B (corresponding to private keys 525A), interim address (es) 530B (corresponding to interim address(es) 530A), and interim private key(s) 535B (corresponding to interim private key(s) 535A). The new asset owner after transaction 550 can know 540B the address(es) 520B, the private key(s) 525B, and the interim address(es) 530B. The new asset owner after transaction 550 can know until at least Tn+4 545B the interim private key(s) 535B.

Earlier, this disclosure described what a changeable address is and how it can be replaced on the smart contract. Optionally, on the smart contract, there can be a storage field called the public address of interim.

The public address of interim is a second type of changeable address. This address can also be replaced at intervals (regular, irregular, or random) on the smart contract. For instance, successive interim addresses can be generated by service 305. The interim address can operate in a similar manner as the classic changeable address. Some embodiments can thus have two changeable addresses on the smart contract. The first changeable address can be called the primary address, and the second changeable address can be called the interim address.

The interim address can optionally be used during the transfer of ownership of an asset. It was previously mentioned how only the owner of the asset knew the key of the changeable address (primary), which guaranteed that they were indeed the owner of the asset.

Consider now the chronology of a transaction of an asset, as reflected in FIG. 5A. At one point in time, the owner knows the key of the primary changeable address. Subsequently, a transfer of the asset takes place, but no address replacement occurs. That is, the key of the primary change-able address remains the primary changeable address.

After this asset transaction, the new owner is informed of key via the user interface. They also have access to the functionality allowing them to transmit the asset and to generate proof of legitimate ownership through the user interface.

The old owner no longer has access to the key of the primary changeable address via the user interface, even if they had learned it before the transaction. Also, they no longer have access to the functionality allowing them to transmit the asset or to generate proof of legitimate owner-ship. At the next renewal of the primary changeable address, the new owner will be the only person in the world who knows and has access (e.g., via the user interface) to the private key of the new primary changeable address.

Regarding the interim addresses/keys reflected in FIG. 5C (with similar understanding presented in FIG. 5B, at Tn, the owner knows the key of the primary changeable address (i.e. "X1"). But, the owner does not know the current interim key (either because they have not asked for it or because they do not have access to it). At Ta, a transfer of the asset takes place, but no address replacement occurs.

The key of the primary changeable address remains X1. After the asset transaction (after Ta), the new owner is informed of key X1 via the user interface. They also have access to the functionality allowing them to transmit the asset and to generate proof of legitimate ownership through the user interface. They are also informed of the current interim key. Therefore, the new owner knows X1 and the current interim key.

The old owner no longer has access to X1 via the UI, even if they had learned it before the transaction. Also, they no longer have access to the functionality allowing them to transmit the asset or to generate proof of legitimate owner-ship. The old owner does not know the current interim key, and they could not have known it before the transmission (and they will never know it). At the next renewal of the primary changeable address at Tn+3, the new owner will be the only person in the world who knows and has access to the private key of the new primary changeable address (via the UI).

Therefore, before Ta, the old owner knew/had access to X1. At Ta, the old owner no longer had access to X1 but the new owner knew/had access to X1. Even if the old owner had noted X1 when they had access, the new owner has access to the current interim key private, unlike the old owner. At Tn+3, the primary changeable address has changed; it is no longer that of which the key could be known by the old owner. The new owner is the only one who knows the new private key of the primary changeable address.

The interim key acts as an "in-between" key that tempo-rarily plays the role of the key of the primary changeable address and also serves as a proof of ownership (an addi-tional security measure) while the key of the primary changeable address is known/could be known by the old owner. In certain cases, the interim key may only be com-municated during the transfer of an asset to a new owner and remains known only to the service 305 at all other times. In other cases, the key of the primary changeable address is accessible to the asset owner via the user interface, but they are to follow a more restrictive protocol if they want to access the interim key. They are told that they cannot transmit the asset unless an interim address renewal has taken place if they ask for the current interim key. In other words, if the current interim key is disclosed, no transmission of the asset is performed until a new interim key has been generated. Other configurations are also imaginable, and the two scenarios presented above do not constitute an exhaustive list.

Returning to FIG. 4, in another example scenario, the replacement trigger 440 can be based on a randomized timing factor, which might include some timing constraints. For instance, the constraints may mandate that the timing factor is not to be less than at least 60 minutes and perhaps no more than 1 month. Service 305 of FIG. 3 is typically the entity that triggers the replacement of the changeable address 435A. As a result, service 305 can determine the replacement trigger 440.

As one example, service 305 may make a first change to the changeable address 435A. Service 305 may then ran-domly select a new time at which to change the address, where the new time is at least one hour from the current change time and at most one month from the current time. As one example, service 305 may select a time of 95 minutes from the current change time. When the 95 minutes elapse, a new address will be used for the changeable address 435A. Then, service 305 may select another random time period at which to update or replace the address. This new time period may be 204 minutes from the most recent change. In this manner, service 305 is able to randomly select times at which to trigger the replacement of a changeable address 435A.

Figure 6:
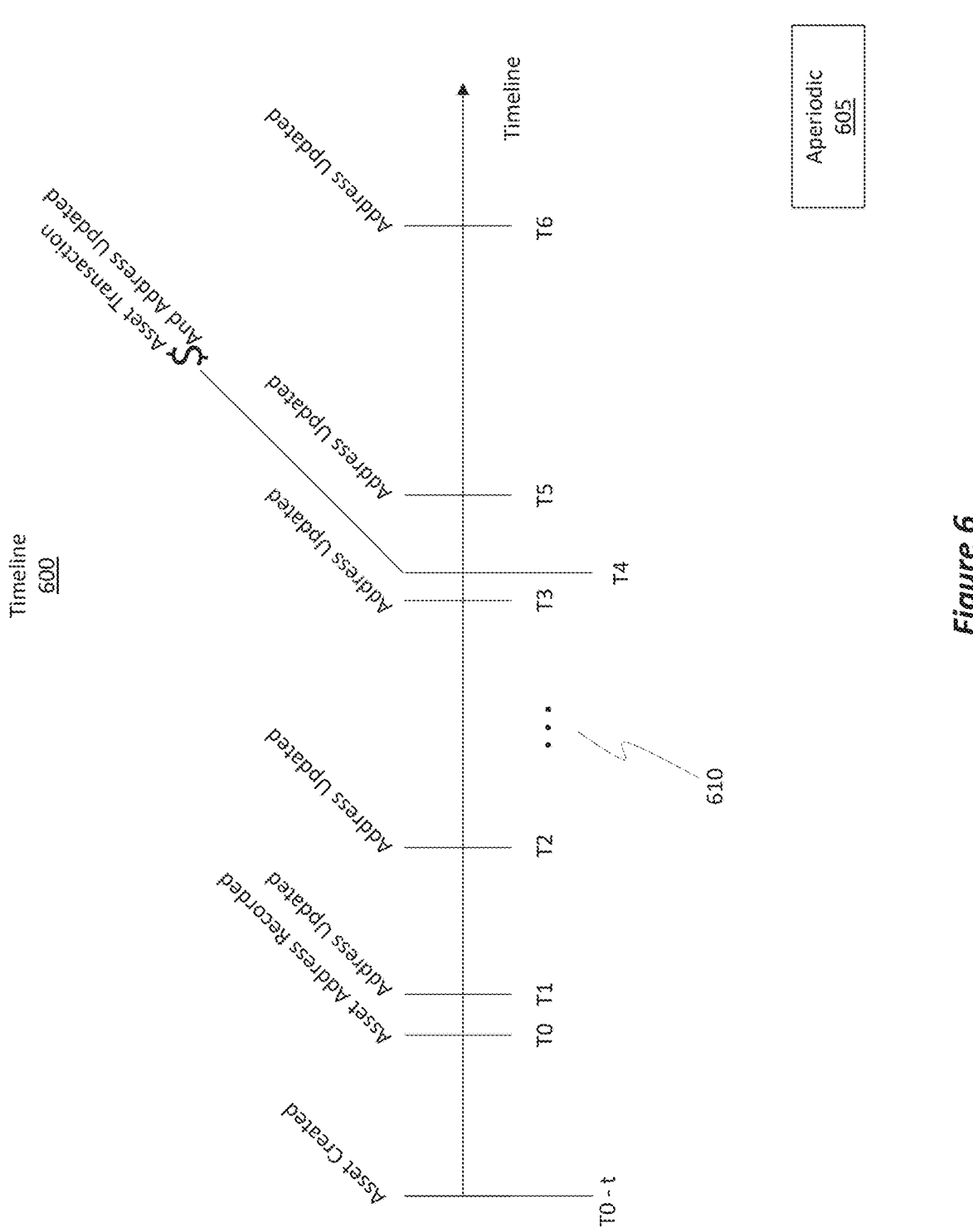
FIG. 6 illustrates another example timeline showing how the changeable address in the smart contract can be updated.

FIG. 6 shows an example timeline 600 representative of an aperiodic 605 scenario in which the changeable address 435A is changed using a randomly generated, aperiodic rate. FIG. 6 shows a time TO-t where the asset is created. At time T0, the asset address is recorded in the blockchain using the service 305, which deploys the smart contract 310 to the blockchain 315, resulting in the asset address being uploaded to the blockchain. With this deployment, the smart contract 310 is also populated using a first changeable address. In some implementations, the first changeable address can be the same as the asset address. In other implementations, the first changeable address may be selected from a group of pre-composed addresses. In some implementations, the first changeable address is a randomly generated address.

In accordance with the first randomly generated period being used in this first example scenario (e.g., perhaps this first randomly generated period is one hour), at time T1, service 305 triggers the changeable address to change (e.g., perhaps via use of a modification tool), resulting in a new address being recorded in the smart contract 310. Subse-quently, a new random period will be selected (e.g., perhaps 90 minutes). At time T2 (e.g., 90 minutes after time T1), another update occurs. These updates may occur randomly for any duration of time, as represented by the ellipsis 610.

At time T3, the address is again updated in accordance with the randomly defined period. After time T3, at time T4, the asset is subjected to a new transaction in which a new owner purchases the asset. Notably, in accordance with the embodiment presented in FIG. 6, the changeable address is changed in response to this new transaction.

The changeable address is not updated to include the address of the new purchaser; rather, the changeable address is updated to reflect a new address that is linked to the asset, as were the previously recorded addresses. The new owner's account profile will reflect the new address as well as the new private key associated with that new address. Further details on this account profile will be provided later.

Subsequently, at times Tn+2, Tn+3, and Tn+4, the changeable address is updated even though the asset is not subjected to any new transactions. By changing the changeable address in this manner, the embodiments are able to hide or obscure when the asset transaction took place.

In this example scenario, a new address change was triggered and recorded in response to the transaction. In some cases, a delay may be used before the new address change is triggered, even though a transaction may have occurred. For instance, if the transaction occurred 5 minutes after the last address change but the parameters stipulate that at least 60 minutes are to elapse after any given address change, then some embodiments may wait the 55 minutes before triggering the new address change.

User Interfaces And User Accounts

Figure 7:
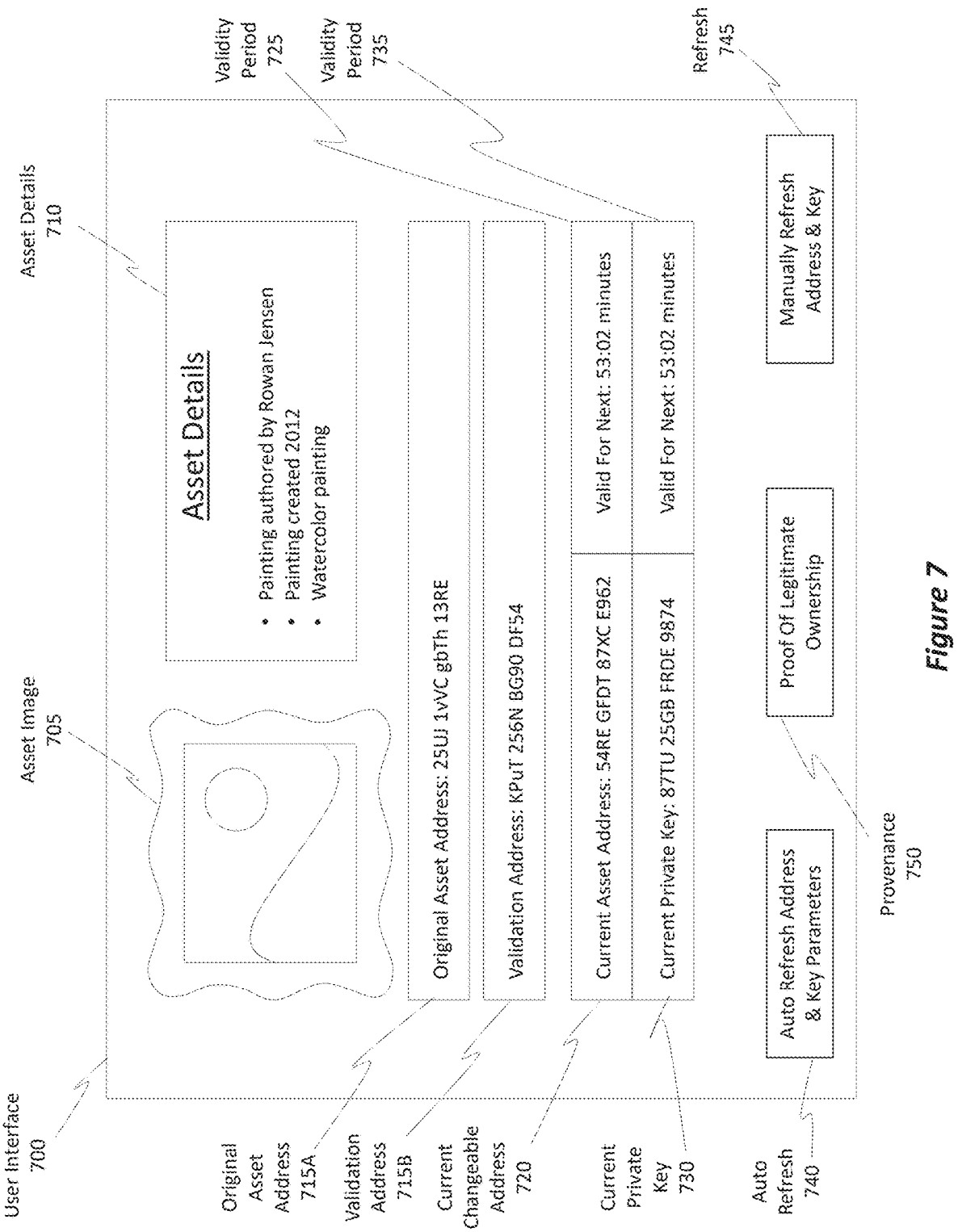
FIG. 7 illustrates an example user interface that can surface information to an owner of an asset.

FIG. 7 illustrates an example user interface 700 that may be used to display information regarding a user's (e.g., owner's) user account. For instance, user interface 700 may display information for a current owner of an asset. User interface 700 can display an image of the asset, as shown by asset image 705. User interface 700 may also display details about that asset, as shown by asset details 710.

User interface 700 also displays the original asset address 715A, which corresponds to the asset address 325 of FIG. 3. Recall, this address is unchanging. User interface 700 may also display the validation address 715B, which corresponds to the creator of the asset and which was discussed previously. Recall, this address is also unchanging.

User interface 700 may also display the current changeable address 720, which corresponds to the changeable address 435A of FIG. 4. Recall, this address does change and is valid only for a select duration. This duration is illustrated in FIG. 7 by the validity period 725. After this validity period 725 expires, a new changeable address will replace the current changeable address even though no transaction with respect to the asset has taken place. In this example scenario, the current changeable address 720 will be changed in 53:02 minutes.

User interface 700 may also display the current private key 730 associated with the current changeable address 720. Recall, this key also changes when the current changeable address 720 changes. Thus, the duration for the current private key 730 will be the same as the duration for the current changeable address 720. This duration is shown as the validity period 735. Notice, the validity period 735 is set to the same value as the validity period 725. Only the current owner of the asset should be made aware of the current private key 730, but the current changeable address 720 is publicly available. Because only the current owner should be made aware of the current private key 730, various security and authentication mechanisms may be employed to ensure that only the current owner has access to this information.

User interface 700 may also include an option to set parameters so as to auto refresh 740 the current changeable address 720 and the current private key 730. For instance, the auto refresh 740 option can be set to allow a user to configure the period or the randomness as to when new addresses and keys will be generated. After these parameters are set, the changeable address and key pair will be automatically changed in accordance with those set parameters.

Optionally, user interface 700 includes an option to trigger a manual refresh 745 of the changeable address and the private key. By selecting the refresh 745 option, a user can asynchronously trigger the generation of a replacement address and private key. In some cases, certain constraints may be associated with the refresh 745 option. For instance, this option may be selectable only after a threshold duration of time has passed since the last time the option was selected or perhaps since the last time the address and key pair were updated. If the threshold duration of time has not passed, this user interface (UI) feature may be greyed out to show that it is not currently selectable.

The owner of the asset is the only one who knows the current private key 730 associated with the current changeable address 720 for the asset. However, unlike the usual functioning of any other classic smart contracts, the owner of the asset does not possess the current private key 730 whose corresponding changeable address (e.g., current changeable address 72) is present on the smart contract; instead, the owner only knows the private key and the service 305 (which is implementing the user interface 700) is in possession of the private key. Because this private key changes, it is useless for the owner to possess the private key (e.g., in his/her crypto wallet) because it will no longer be valid after the next change event. The owner is, therefore, the only individual who knows (i.e. has access to) the private key via the user interface 700, thereby ensuring that the owner is the legitimate owner.

One might then ask how can the owner use the private key, or rather, how is it useful to the owner. The owner can use the private to generate the "proof of legitimate ownership." This proof of legitimate ownership can optionally have the characteristic of being "timed" since it is produced with a key of a changeable address whose presence on the smart contract lasts only for a limited duration.

For instance, user interface 700 further includes an option to generate provenance 750 data. Selecting this option allows the owner of the asset to prove to anyone that the owner actually is indeed the legitimate owner of the asset (i.e. to generate the "proof of legitimate ownership"). Service 305 also enables for the transmission of the proof of ownership in a confidential and secure manner.

Returning now to FIG. 3, service 305 is thus configured to generate the smart contract 310 and to deploy the smart contract 310 to the blockchain 315. Service 305 also provides a secure user account 330 for an owner of the asset 320. Service 305 generates the address(es) 335 that will be used as the changeable address mentioned previously. Service 305 also generates the private key(s) 340 that are associated with the address(es) 335. The address(es) 335 and the private key(s) 340 can be displayed to the owner via the user interface 700 of FIG. 7.

Notably, the address(es) 335 are linked to the asset 320; the address(es) 335 are not linked to an asset owner 345, as shown by the no link 350 label. Although the address(es) 335 are not linked to the asset owner 345, the asset owner 345 will have access to the address(es) 335 and the corresponding private key(s) 340 via the secure user account 330, which can be surfaced to the asset owner 345 via the user interface 700 of FIG. 7.

Service 305 may transmit the address(es) 335 to the smart contract 310. As will be discussed in more detail later, in some cases, the smart contract 310 includes a tool that will select one of the address(es) 335 to operate as the current changeable address. Service 305 may be apprised of this selection and update the secure user account 330 to reflect this selection. In other cases, service 305 may select a specific address and transmit that specific address to the smart contract 310. In both scenarios, service 305 generates the address(es) 335. In some scenarios, however, smart contract 310 selects one address that will be used as the changeable address while in other scenarios service 305 performs the selection.

Recall, with traditional public addresses, those addresses were publicly available. Using the traditional technology, a malicious user could potentially gather all of the assets having the same public address and then discern the identity of the owner of that public address. In other words, under traditional techniques, a malicious user could collect or identify all of the smart contracts on which a specific public address appears. That malicious user could then deduce the identity of the owner hiding behind that public address. As a result, the identity of the owner is not truly kept private.

By breaking the link between the asset owner and the changeable address and by changing the changeable address, the embodiments prevent malicious users from being able to not only discern when a transaction takes place but also to prevent them from discerning who the asset owner is. Therefore, unlike a standard smart contract where the public address presented on the smart contract is also present on the smart contracts of other assets owner by the same owner, the public address on the disclosed smart contract (i.e. the described "changeable address") is not present on the smart contracts of other assets owner by the same owner of the instant asset. That is, the changeable address is associated with the asset and not with the asset's owner.

Any given sequence of symbols in the changeable address is present only on the smart contract corresponding to a specific asset, and this same sequence of symbols will not be present on the smart contracts of other assets owned by the same owner. Therefore, no one will be able to recover or discern the identity of the asset owner.

When a new changeable address is generated by the service 305, service 305 can transmit that new changeable address to the smart contract 310 via a registration message 355. The smart contract 310 is able to receive the registration message 355 and update its storage space to include the new changeable address.

Figure 8:
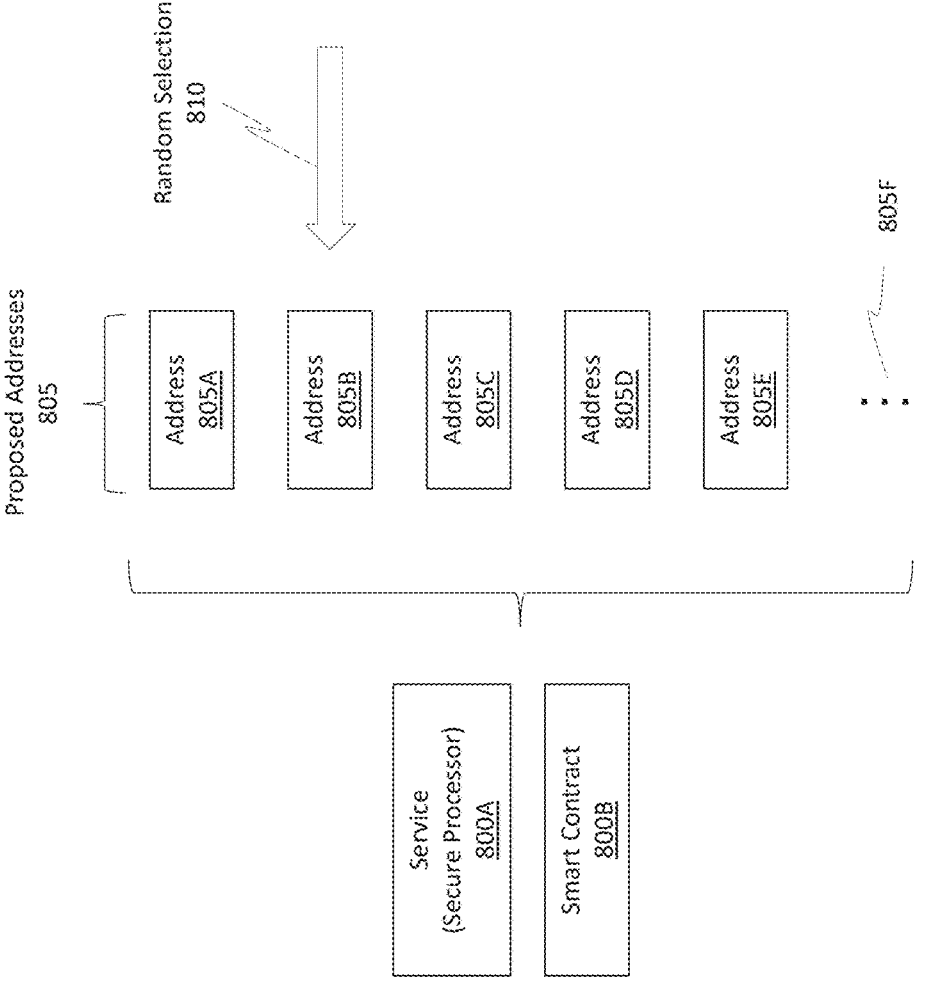
FIG. 8 illustrates a technique for selecting which changeable address will be used.

FIG. 8 provides some additional details as to how some embodiments generate the changeable address. FIG. 8 shows the service 800A, which is representative of service 305 from FIG. 3. In some cases, service 800A generates multiple proposed addresses 805, which include addresses 805A, 805B, 805C, 805D, and 805E. The ellipsis 805F indicates how any number of proposed addresses may be generated. Service 800A may then facilitate a random selection 810 from among the proposed addresses 805 to select one that will serve as the new changeable address. The randomness of this generation and selection technique can help prevent malicious users from attempting to potentially discern which address is associated with which owner. Further details on potential and future addresses will be provided later. FIG. 8 also shows how the above operations can be performed by the smart contract 800B, which is representative of any of the smart contracts disclosed herein.

Thus, the disclosed embodiments employ the use of various components. These components include a uniquely structured smart contract, a secure process (e.g., service 305), a signed asset, a secure account and user interface, and the blockchain.

The storage space of the smart contract stores addresses associated with keys. The tools space of the smart contract includes logically programed tools. Messages can be sent to the smart contract to update the addresses and to trigger the tools. One example of such a message is the registration message 355 of FIG. 3.

Multiple address and key types are used by the disclosed embodiments. These types include the following: a creation (address and key pair) type, a validation (address and key pair) type, an asset (address and key pair) type, a proposed (address and key pair) type, a changeable (address and key pair) type, and a tools (address and key pair) type.

Regarding the proposed type, this type includes both "future" asset addresses and keys and "potential" asset addresses and key. Regarding the tools type, this type includes various basic tools addresses and keys, such as the following: registration address and key, modification address and key, and unique renewal address and key. The tools type further includes security tool addresses and keys, such as the following: unlocking address and key, locking address and key, authorization address and key, selection address and key, and result address and key.

The above addresses and keys are created by the disclosed service 305 of FIG. 3. To create a private key (e.g., any of the above referenced keys), service 305 generates a random number having a high degree of randomness. Then, service 305 converts the random number into a format used to make the number into a private key. Subsequently, from this obtained private key, service 305 creates a corresponding public address (e.g., any of the addresses mentioned above).

Further description will now be provided for each of the addresses and keys mentioned above. The creation address and the creation key are the first private key and the first address created by service 305. The creation address and key are used to deploy the smart contract onto the blockchain. In some cases, the creation address and key are fixed and are not meant to change.

The validation address is present on the smart contract. The validation key, on the other hand, can be known only to the creator of the asset. The creator can use the validation key to validate the address associated with the asset. Although, in certain scenarios, the creator has access to the validation key, the creator typically does not retain possession of the validation key, as described earlier. Therefore, the validation address and key are associated with the creator, but they do not belong to the creator. The validation address and key represent the origin of an asset by certifying, attesting, and guaranteeing that the asset was actually created by the creator. The creator can use the validation key to acknowledge this asset as being one of his/her creations.

The authentication validation tool operates with the authentication validation message and the validation key and address. The authentication validation message is signed/sealed by the validation key to activate and execute the authentication validation too. Once activated, the authentication validation tool verifies that it is indeed the validation key that has signed/sealed the authentication validation message. If this is the case, the authentication validation tool executes, meaning that it indicates on the smart contract in any conceivable way that the validation address has been verified. For instance, the embodiments can record or display on the smart contract the following phrase (or any phrase): "This work was created by Artist-Name." "The artwork is authentic, the validation address is certified." To be clear, the authentication validation message is signed by the validation key. This allows anyone to ensure, by consulting the smart contract in question, that the smart contract received an authentication validation message that was indeed sealed by the validation key. This demonstrates that the asset is recognized by the asset creator.

There are different ways to link the validation key and address to the smart contract. For example, to link the artist to the artwork in question, the validation key can (i) either sign the deployment of the smart contract, (ii) sign the modification message, (iii) sign a registration message, (iv) sign an authentication validation message, or (v) sign a message of a tool. In these cases, the authentication validation tool, or at least another tool, verifies that it is indeed the validation key that sealed the message.

The changeable address is present on the smart contract. The changeable key, however, is known only to the owner of the asset. At some period, the changeable address is replaced in the smart contract by a new changeable address. Correspondingly, the changeable key is replaced by a new changeable key, though these changeable keys are not included in the smart contract. At any given moment in time, there is always only a single changeable key and a single changeable address that is active for the asset. The modification tool allows for renewal of the changeable address within the storage space of the smart contract.

As mentioned above, service 305 generates the changeable address and changeable key at some rate, whether that rate is periodic or aperiodic. This changeable address and changeable key are included among multiple available or "proposed" changeable addresses and "proposed" changeable keys.

In some embodiments, there are two different types of proposed changeable addresses and proposed changeable keys. These two different types include future changeable addresses and future changeable keys and potential changeable addresses and potential changeable keys. Among those two different types, at least one of the changeable addresses and changeable keys will become the new changeable address and the new changeable key. The future changeable addresses are communicated to the smart contract through one or more registration messages. The future changeable keys, on the other hand, are not communicated to the smart contract. The future changeable addresses and future changeable keys are certain to become one of the used changeable addresses and changeable keys in the future, whereas the potential changeable addresses and potential changeable keys are not certain.

The potential changeable addresses are also communicated to the smart contract through one or more registration messages. The potential changeable keys, on the other hand, are not communicated to the smart contract. The potential changeable addresses and keys may potentially become the selected address and key, but the selection is based on one or more conditions.

In contrast to the future changeable addresses, the potential changeable addresses are subjected to a selection tool of the smart contract. Any potential changeable address that is not selected by the selection tool is eliminated from the smart contract. Any potential changeable address that is selected by the selection tool becomes either immediately the new changeable address or a future changeable address, which will be used later. This differentiation is based on the configuration of the smart contract. In this regard, after being submitted to the selection tool, if a potential address/key pair is selected, they do not necessarily become the immediate new changeable address/key pair; rather, they may become a future changeable address/key pair. When the smart contract's selection tool selects an address, the service 305 may be informed of this selection and update the user account to reflect the selected address and key pair. In some cases, service 305 makes the selection of the address and key pair and presents the address to the smart contract. Thus, in some cases, the smart contract selects the address while in other cases service 305 selects the address.

A tool key is used to seal a message intended for a tool in the smart contract. The tool address is known by the smart contract (and therefore presented on it). The tool address enables checking that a message has been sealed using the tool key. In some scenarios, capabilities offered by the currently available blockchains may not allow sealing a message using multiple keys at once. In such scenarios, each message sent to the smart contract can be sealed by only one key at a time. That being said, the disclosed embodiments enable multiple sealings by multiple keys. For instance, it is possible (in accordance with the disclosed principles) to seal a single message with multiple different keys each time the message is sent to the smart contract. Because the smart contract knows the address associated with the key that placed the seal on the message as one of the addresses, it is possible to seal the same message with a different key known by the smart contract each time.

In some implementations, messages sealed for a smart contract allow triggering at least one tool of the smart contract. Therefore, tool addresses and tool keys can be linked to at least one tool of the smart contract. Tool addresses and tool keys are intended to remain fixed. However, they can also be changed at some rate, such as the same rate as the changeable address and changeable key.

Examples of various tools in the smart contract include, but are not limited to, the following: a registration tool, a modification tool, and a unique renewal tool. Each of these tools is associated with one or more addresses and keys as well as potentially corresponding messages. These tools, addresses, keys, and messages can function in cooperation with the validation address/key and the changeable address/key. These three tools can be referred to as the "basic" tools inasmuch as, at least in some embodiments, every smart contract includes at least these the unique renewal tool or the other two tools.

The unique renewal tool has the function of registering addresses given to it on the smart contract. This tool can also replace one or more addresses present in the smart contract's storage with another address at the same time. For example, the tool can receive (e.g., in a message) the value of a public address, and the tool can use this public address to replace the current value of the changeable address on the smart contract.

The registration tool's function is to register addresses communicated to it on the smart contract. These addresses are communicated to the registration tool in registration messages that allow for both activating and executing the registration tool after verification of the seal on the message. Addresses registered by the registration tool are stored in the smart contract's storage space. In some implementations, the registration tool is the only tool in the smart contract that can register new addresses on the smart contract.

In some implementations, the registration tool is configured to determine which type of address or specific address to register in the smart contract's storage space based on the information provided in the registration message. This action can be performed in multiple different ways. In a first manner, the type of address or specific address is specified directly within the registration message. For instance, if the message concerns a future changeable address or a potential changeable address, the message may indicate such information. The registration tool can examine the message to determine the address type or specific address.

With respect to a second manner, there can be various types of registration tools, with each tool being dedicated to registering a specific type of address or specific address. For example, some scenarios may involve a registration tool for future changeable addresses and a different registration tool for potential changeable addresses.

With respect to a third manner, the registration tool can also be configured to identify which type of address or specific address the registration tool is supposed to register in the smart contract's storage space. For instance, the registration tool can be configured to determine that at a certain point in time, only future changeable addresses are communicated to it via a registration message. If a message arrives within a threshold amount of time relative to that point in time, then the registration tool can determine that the message is of a specific type (e.g., a registration message).

Among the addresses communicated to the smart contract by registration messages and registered in its storage space by the registration tool, one can find proposed addresses, namely future changeable addresses and potential changeable addresses. Proposed addresses are the primary addresses that the registration tool is responsible for registering on the smart contract. Typically, the registration tool will register at least one proposed address for every period of time in the smart contract's storage space. The registration of one or several proposed addresses every period of time is the primary function of the registration tool.

There are various reasons why it is beneficial to have the registration tool register one or several tool addresses (or any of the other addresses, e.g., the validation address) in the smart contract's storage space. These reasons include scenarios involving a failure to communicate a tool address during the smart contract's deployment; the addition or activation of a previously absent or unused tool on the smart contract; or a change of a tool address for security reasons or otherwise. Among the addresses communicated to the smart contract through registration messages and registered in its storage space by the registration tool, there can be found other types of addresses, including, for example, changeable addresses, validation addresses, or tool addresses.

The modification tool has the function of replacing an address present in the smart contract's storage space with another address. In some scenarios, only the modification tool can replace an address. Whichever address is asked to be changed, the modification tool will take care of it if the request is properly made (e.g., correct message seal, designated address existent on the smart contract and identifiable, etc.). The address to be replaced is designated/indicated either in the modification message, or by a selection tool. In some cases, the replacement address is an address already present on the smart contract when the modification tool becomes active. The replacement address may also be designated/indicated either by the modification message or by a selection tool. The modification message can designate/ indicate the address to be replaced and the replacement address. In some cases, however, the modification message does not communicate them to the smart contract because they are already known by the smart contract.

Notably, the designation/indication of an address is different than the communication of that address. In some cases, only the registration message allows for the communication of addresses to the smart contract in order to register them using the registration tool. The modification message, however, might not do this; that is, the modification message might not communicate addresses to the smart contract in order to register them using the modification tool. The modification tool does not register addresses; rather, the modification tool changes existing addresses. In some cases, particularly ones where the service 305 selects which address is to be used by the smart contract, it might be the case that the modification message does include the address selected by the service 305.

The modification tool identifies which type of address (or specific address) indicated in the modification message the modification tool is supposed to change in various ways. In a first way, the modification tool recognizes the type of address to be changed within the modification message itself. For example, the modification message might refer to a future changeable address or to a potential changeable address. In a second way, there can be several types of modification tools, each dedicated to change a specific type of address. In a third manner, the modification tool can be programmed to identify which type of address it is supposed to change as well as the address to be replaced and the replacement address. For example, the modification tool may know that at a certain hour only future changeable addresses are indicated via a modification message.

The modification tool can change multiple addresses. For instance, the modification tool can change the changeable address. For example, the modification tool can change the changeable address every hour (or any other periodic or aperiodic duration of time) in the storage space. The modification tool can also change the proposed changeable addresses, including the future changeable addresses and the potential changeable addresses. In some implementations, the modification tool will change at least one proposed address every time period during which an address is valid. The modification tool can also change tool addresses. Normally, there is no reason to change the tool addresses, but if there is a need to change one or several tool addresses, then the modification tool can do so. There are various reasons that may trigger the modification tool to change one or several tool addresses, including communication errors or miscommunications of a tool address during deployment or for security reasons.

The following tools, addresses, keys, and messages are components of various security systems in the disclosed embodiments. These components collectively form the security systems of the embodiments and may be referred as to "security" tools. The security tools provide security for the smart contract, particularly with regard to the renewal of the changeable addresses and keys. In some cases, the security tools function according to a common mechanism in that they impose one or more conditions that are to be met. For instance, some of the security tools aim to lock or unlock tools based on specific conditions while others aim to eliminate or select potential changeable addresses based on other conditions.

Typically, the security tools operate on the basic tools. In some scenarios, however, the security tools can operate on other security tools, thereby forming a chain of security measures. Regarding the "conditions" mentioned earlier, in some implementations the conditions can be "single choice." Single choice conditions are ones that wait for a response by requiring only one possible option to be met. Examples of single choice conditions include the following: a tool executes only if a message sent to it contains a specific keyword; the stock market price must be rising for a tool to execute; if a potential changeable address contains exactly one "5," that address is selected; if a potential changeable address contains only one "6," that address is eliminated; the message sent to a given tool must contain a total sum of 1524 by adding all of its digits for the tool to execute. Of course, these are example conditions only and should not be viewed as being limiting.

In some implementations, the conditions can be "multiple choice." Multiple choice conditions are ones that wait for a response allowing several possible options. Various examples of multiple choice conditions include the following: the message sent to this tool must contain the word "Blue" at least once for it to execute; Mr. Smith's fortune must be over $5,000,000 for this tool to execute; if a potential changeable address contains more than two occurrences of the character "5," it is eliminated, and so on.

In some cases, there are four main security tools. These security tools include the following: a locking/unlocking security tool, an authorization security tool, a selection security tool, and a result security tool. Regarding the locking/unlocking tool, this tool can be used to unconditionally unlock addresses, keys, messages, or tools. This tool can also be used to unconditionally unlock the addresses, keys, messages, or tools. Conditional unique unlocking or conditional multiple unlocking can also be performed by this tool. This tool can also perform corresponding locking operations.

The authorization tool provides for conditional single authorization or conditional multiple authorization for addresses, keys, messages, and tools. The selection tool provides for conditional single selection or conditional multiple selection for addresses, keys, messages, and tools. The result tool provides results for unlocking/locking actions, results for selection actions, and results for authorization actions for addresses, keys, messages, and tools. Typically, the result tool is the tool that functions when multiple other tools are being jointly used. That is, the result tool produces a result based on the responses obtained from multiple other tools.

In most scenarios, before the deployment of the smart contract, service 305 of FIG. 3 creates the various tool keys and corresponding tool addresses. After their creation, new entries can appear in the storage space of the smart contract. These new entries include the values of the various tool addresses. For instance, a public registration address can be used to populate the "public registration address" field of the smart contract. It should be noted how for any of the above tools, there might only be a single corresponding address and key or, alternatively, there might be multiple addresses and keys. As a result, the fields in the smart contract may include a single field for each tool or multiple fields for each tool. When the service 305 deploys the smart contract, service 305 specifies in a deployment message having various instructions.

The deployment message may include the logic or lines of code for the smart contract. The deployment message can also include initial data storage values for the following: the validation address(es), the changeable address(es), one or more future changeable addresses, one or more potential changeable addresses, the registration address(es), the modification address(es), the unique renewal address(es), the validation authentication address(es), the locking address(es), the unlocking address(es), the authorization address(es), the selection address(es) and/or the result address(es).

In some implementations, messages destined for the smart contract are addressed to a specific tool of the smart contract. After a message is received by the smart control tool, that tool will then be triggered based on the message. A tool, once triggered, does not necessarily execute immediately, however.

For instance, after the tool is triggered, the tool can first verify that the message was meant for that specific tool by analyzing the signature used to sign the message. If the message was signed using the correct key, then the tool recognizes that the message was indeed meant for that tool, and the tool will then execute.

On the other hand, if the message was signed using a key for a different tool or a foreign key (e.g., one not specified in the smart contract), the tool can optionally send a reply message indicating that the message was not meant for this particular tool or that the signature is not recognized. Each type of tool in the smart contract can optionally be linked to a specific type of message that is particular to that given tool. Thus, a certain type of message can be used to activate a certain type of tool. Often, a given tool and its corresponding message share a common name. For instance, the registration tool can be triggered by a registration message; a modification tool can be triggered by a modification message; and so on. In some implementations, service 305 governs the transmission of messages to the smart contract, such that only service 305 is able to transmit messages to the smart contract.

Before sending a message to the smart contract, service 305 may seal the message using the key corresponding to the tool that is to receive the message. For example, a modification message may be sealed by service 305 using a modification key. One difference between activating a tool (e.g., in response to that tool receiving a message) and executing that tool is that once a tool is activated, the tool prepares to execute its functions, such as by checking the sealing information on the message. In contrast, when a tool executes, it actually performs its functions.

As mentioned, multiple tools can be merged together so as to operate in unison. Messages meant for these tools as well as their associated tool keys and addresses might thus be impacted. For instance, a message sent to one of the tools might activate and trigger the combination of multiple tools. Certain addresses can have multiple roles. For example, a validation address may also be used as an address associated with a registration tool. As another example, a changeable address can also be used as an address associated with a modification tool.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 9, which illustrates a flowchart of an example method 900 for introducing and/or enhancing privacy measures for ownership data associated with an asset that is managed by a smart contract residing in a blockchain. Method 900 can be implemented within the architecture 300 of FIG. 3. Method 900 may also be implemented by service 305.

Method 900 includes an act (act 905) of generating a smart contract for an asset. The smart contract is structured to include a storage space that will be publicly visible when the smart contract resides in a blockchain. The storage space is structured to include a public address field comprising a first public address value. The first public address value is associated with a first private key that is usable to generate a proof of ownership of the asset. The asset may be any type of asset, such as a digital asset or a physical asset.

In some implementations, the storage space is further structured to include an asset address field comprising an asset address that is unchanging and that identifies the asset. Similarly, in some implementations, the storage space is further structured to include a validation address field comprising a validation address that is unchanging and that identifies a creator of the asset.

Act 910 includes deploying the smart contract to the blockchain. In some cases, the deployment process includes sending a blockchain transaction that includes the smart contract's compiled code. This transaction omits or does not specify a particular recipient. The deployment might involve a deployment plugin or deployment script.

After the smart contract is deployed to the blockchain, act 915 includes generating a second private key. This second private key may be generated at any time after the smart contract is deployed. In some cases, the second private key is required to be generated within a maximum threshold period of time. In other cases, the second key can be generated at any time without regard to a threshold time period.

Act 920 includes using the second private key to generate a second public address value. In some scenarios, new private keys, including the second private key, are generated in response to the occurrence of a timing condition. The timing condition may be a determined periodic rate at which the new private keys are generated. As various examples, the periodic rate may be a minimum of 60 minutes such that no new private key is generated until at least 60 minutes have elapsed since generation of a previous new private key. The timing condition may be a randomly selected rate at which the new private keys are generated.

The second public address value may be one of multiple public address values that are generated. These multiple values may be transmitted to the smart contract. In some cases, the smart contract will then select one of the values. In other cases, the service selects the value to be used.

Despite a current owner of the asset not changing such that no transactions involving the asset are performed, act 925 includes transmitting a message (e.g., perhaps comprising the second public address value) to the smart contract. This transmission operates as a trigger to cause the smart contract to replace the first public address value in the public address field with the second public address value. In some cases, the smart contract chose the second public address value from among multiple potential or available public address values, as mentioned previously. In some cases, the service selected the second public address value for use by the smart contract.

In some scenarios, replacing public address values in the public address field is performed in accordance with a periodic rate, such as perhaps every select number of minutes, hours, days, weeks, or perhaps months. In some cases, replacing public address values in the public address field is performed in accordance with an aperiodic rate.

As various examples, one validity duration of the address/key pair may last for 60 minutes while the subsequent validity duration of the pair may last for 90 minutes. The next duration may last for 75 minutes. The next duration may last for 23 hours. The next duration may last for 62 minutes. The following duration may last for 3 days. Indeed, any duration may be set. Thus, in some scenarios, replacing public address values in the public address field is performed in accordance with a randomly selected rate while in other scenarios replacing public address values in the public address field is performed in accordance with a predetermined rate.

Optionally, when the process of replacing public address values in the public address field is performed in accordance with a periodic rate, the method may further include various additional acts. One optional act includes detecting a transfer of ownership from the current owner to a second owner, where the transfer of ownership occurs after the first public address value is replaced by the second public address value. Another act includes delaying replacing the second public address value with a third public address value until such time as a current validity duration for the second public address value elapses. For instance, if the rate was every 60 minutes, but the transaction occurred at the 33 minute mark, the embodiments may wait an additional 27 minutes before performing the replacement action. In response to the current validity duration elapsing, another act includes triggering replacement of the second public address value in the public address field of the smart contract with the third public address value.

Optionally, when the process of replacing public address values in the public address field is performed in accordance with a randomly selected aperiodic rate, the method may further include other acts. One optional act includes detecting a transfer of ownership from the current owner to a second owner, where the transfer of ownership occurs after the first public address value is replaced by the second public address value. Another act includes triggering replacement of the second public address value in the public address field of the smart contract with a third public address value. This replacement may occur immediately or within a threshold time period after the transaction or the replacement may occur after the current duration expires. After a randomly selected amount of time has elapsed since the second public address value was replaced by the third public address value, another act may include replacing the third public address value with a fourth public address value despite the second owner retaining ownership of the asset.

Returning to FIG. 9, act 930 includes detecting a transfer of ownership from the current owner to a second owner. The transfer of ownership occurs after the first public address value is replaced by the second public address value.

Act 935 includes delaying triggering replacement of the second public address value in the public address field of the smart contract with a third public address value until the timing condition is detected. As mentioned above, any timing condition can be used, whether it is a periodic timing condition or an aperiodic timing condition.

Optionally, the embodiments can display a user interface (UI) for the current owner of the asset. A layout of the UI may be structured to include various features. For instance, one feature may include a first UI field identifying an asset address that uniquely identifies the asset. Another feature may include a second UI field identifying a validation address that uniquely identifies a creator of the asset. Another feature may include a third UI field identifying the second public address value. Another feature may include a fourth UI field identifying the second private key. Yet another feature may include a validity period for the second public address value, where the validity period reflects an amount of time remaining that the second public address value will be valid. Notably, when the amount of time remaining elapses, the second public address value will be replaced by a third public address value.

Another feature may include a validity period for the second private key, where the validity period reflects an amount of time remaining that the second private key will be valid. When the amount of time remaining elapses, the second private key will be replaced by a third private key.

Another feature may include a UI field that, when selected, triggers generation of a third private key and a third public address value and that triggers replacement of the second public address value in the public address field of the storage space with the third public address value. Another feature may include a UI field that, when selected, defines a period at which new private keys and new public address values are to be generated and at which the public address field in the storage space of the smart contract is to be updated.

Additional Details

A non-fungible token (NFT) is a smart contract in the form of the ERC-721 smart contract. The sale of an NFT follows a regular transaction pattern on the blockchain. In other words, every NFT transaction is exposed, impacted, submitted, and confronted with the issues mentioned previously. That is, because every NFT transaction is publicly visible, the date of every NFT transaction can be used to infer the transaction date of an asset. Also, because the same owner's public address is used for this asset and any other assets the same owner has, it is possible to deduce the identity of the asset owner. Thus, even the use of NFTs is subject to these issues, which are addressed by the disclosed embodiments.

The ERC-721 smart contract includes two fields in the storage space. One field includes the URL of the digital artwork hosted online. The other field includes the public address of the ERC-721 smart contract owner.

Regarding the field containing the URL, contrary to sales pitches for NFTs, these URLs do not authenticate an asset in an infallible way. Instead, they authenticate only the URL of that digital asset (i.e. they authenticate the internet address of the asset). The term NFT plays on the fact that all data is public and is irreversible on the blockchain, thereby supposedly making the NFT unique, authentic, and hence non-fungible. However, in practice, only the URL of the digital artwork is what can be considered non-fungible. The artwork itself is not authenticated at all. Stopping to host the digital good at that address renders the NFT useless and void of meaning.

Regarding the field containing the public address, the owner is the one who hold the private key linked to the public address displayed on the NFT. An intruder gaining knowledge of this private key allows them to do whatever they would like with the questioned NFT, such as selling it instead of the real owner. Thus, the owner should keep the private key secret, and the owner is solely responsible for doing so.

To become the owner of the NFT, traditional systems required that a user create an account on the blockchain. This account typically requires maintenance. For instance, the owner must store, protect, and manage his/her passwords or have a password manage. Also, the owner must securely store the private key.

NFTs were also introduced as being non-fungible. However, anyone can create an NFT as there is no regulation on the matter. What that means is that a person does not necessarily have to be the creator of an asset in order to generate an NFT for the asset. What can possibly occur is a scenario where other NFTs are generated using the same artwork URL while displaying the public address of a different owner. Also, it is possible that other NFTs are generated for the same work but have different URLs, meaning they are hosted elsewhere. As a consequence, situations can arise where multiple owners claim ownership of another person's work.

Currently, there is no way to know if existing NFTs are truly authentic. Scams and thefts are developing around these assets. For instance, some can sell NFTs that do not belong to them, even on legitimate platforms. That is why a significant majority of NFTs today are either forgeries, stolen digital works, or counterfeits.

The disclosed embodiments, on the other hand, provide a mechanism to truly authenticate an asset in an infallible manner. The embodiments achieve the objectives of security, confidentiality, and anonymity for assets through the regular renewal of the changeable address. This regular renewal also addresses the issue of transaction confidentiality on the blockchain as well as the anonymization of owners.

In accordance with the disclosed principles, a sequence of symbols is distinctly visible on the asset of interest. This asset is linked, via the disclosed smart contract, to a changeable address. The changeable address is associated with a private key. The owner of this asset is the only one who knows the current private key. Both the changeable address and the private key change at a periodic or aperiodic rate. Knowledge of this private key confirms to the owner that the owner is indeed the sole and unique legitimate owner of the asset in question. The option to provide proof of legal ownership allows the owner to prove to anyone that the owner is indeed the sole and unique legitimate owner of the artwork in question.

The owner of the asset does not need to create any specific blockchain account. Therefore, they are released from any requirement to find a way to store and secure a private key or to provision a crypto wallet.

The owner, as well as the public, can be certain that the asset is authentic by the claimed creator because a specific address, which is referred to as the "validation address," is present on the smart contract for this asset and on all other smart contracts for assets by the same creator and that the validation key signed/sealed a message to the smart contract. That is, this validation address represents the creator.

The owner remains completely anonymous on the blockchain thanks to the disclosed system. No one will be able to discern the owner's identity.

Transactions of an asset authenticated using the disclosed techniques on the blockchain remain confidential. No one can see when the transaction of the authentication of the asset takes place or if it occurred.

Transmission of an Asset

When an asset (e.g., an artwork) bearing a signature is acquired by a new owner, the current owner can transmit the ownership of the artwork. The owner of a signed artwork has access, via the user interface, to the ability to transmit the ownership of their artwork. There are various ways to transmit an ownership of an artwork via the user interface. Two example implementations are recited below.

In the following text, "owner" is the collector and current owner of the signed artwork in the process of transmitting or selling. "Next owner" is the collector who is in the process of acquiring the signed artwork.

During the transmission process, the owner and the next owner may need to exchange confidential information. This exchange can be done through any secure method imaginable.

In a first example procedure, the next owner creates a secure user account via the user interface of service 305. The service 305 then assigns them an identifier. The next owner communicates, through a secure channel, this identifier to the owner of the signed artwork.

When the owner wants to perform the transmission of the ownership of his artwork at the level of the user interface of service 305, the owner can provide the next owner's identifier and the identifier of the artwork (which is the number engraved on the artwork) on a dedicated page of the site.

Then, the owner can click on the "I confirm that I want to transmit the ownership of this artwork with this number to the collector with this identifier" button.

The owner (now old owner) no longer has access to the private key of the changeable address via the secure user account on the UI of service 305. The next owner then has access to the private key of the changeable address via the secure user account on the UI of service 305.

In a second example procedure, to transmit the ownership of the artwork, the owner and the next owner are registered with service 305 through the user interface. Once they have authenticated themselves at the user interface level, a procedure for transmitting the ownership of the artwork can be performed, as described below.

First, the owner informs service 305 that the owner wants to transfer the ownership of the artwork with number 0xjkLsnf (as one example) engraved on it. Next, the secure processor (e.g., service 305) displays a code to open the transmission session to the owner. The owner shares this code with the next owner.

The next owner then sends the code given by the owner to the secure processor. The secure processor asks the owner for the number engraved on the artwork. If it is incorrect, the secure processor asks the owner to try again.

The secure processor asks the next owner for the number engraved on the artwork. If it is incorrect, the secure processor asks the next owner to try again.

The secure processor sends back to the owner the title of the artwork, edition number, artist name, description, and number engraved on the artwork and asks them to confirm that this is indeed the signed artwork they wish to transfer (specifically the ownership). If the owner confirms the information, the secure processor sends to the next owner the title of the artwork, edition number, artist name, description, and number engraved on the artwork and asks them to confirm that this is indeed the signed artwork they wish to acquire (specifically the ownership).

If the next owner confirms the information, the secure processor informs the owner that they will no longer have access to the key of the changeable address if they confirm that they wish to transmit the ownership of the artwork. If the owner confirms the information, then the secure processor informs the owner that the transmission of the ownership of the signed artwork was successful.

The secure processor also informs the next owner that they have successfully acquired the ownership of the signed artwork with number: (number engraved on the artwork), and that the current private key of the changeable address is: (current private key of the changeable address).

Blockchain Node

For service 305 to communicate information/messages to the blockchain, those messages are sent to a node in the blockchain. A blockchain node consists of a software component that one downloads from the internet, installs on a computer, and then starts up. For the software to function correctly, the computer also needs to be connected to the Internet. To connect service 305 to a blockchain node, there are several possibilities. Among these possibilities, one can install and run a blockchain node on the same computer where service 305 is running. Another option is that one can install and run a blockchain node on a separate computer specifically for this purpose, and have the service 305 communicate information using an example IP address of that computer, Another option is that one can use online services that run blockchain nodes and provide a URL for sending messages to these blockchain nodes. Any other means of communication between service 305 and the blockchain are available.

Service 305 can be connected to the blockchain through one of these means or any other imaginable way. Service 305 is therefore connected to a blockchain node/connected to the blockchain, allowing it to send messages to the blockchain (for deployment and for supplying cryptocurrency addresses-detailed below) and to send messages to smart contract (once it has been deployed on the blockchain).

Transaction Fees

Just as one buys stamps based on the size of a letter or package when sending mail through the post office, one must also pay money in cryptocurrencies whose amount depends on the "size/length" of the message for it to be properly sent on the blockchain. In the context of blockchains, this money is referred to as "transaction fees." For example, for the Ethereum blockchain, the cryptocurrency is ether and therefore transaction fees are paid in Ethers.

A blockchain is designed such that it associates a certain amount of cryptocurrencies with each public address. For example, the Ethereum blockchain records for each public address an amount of Ethers associated with it. Therefore, from a technical standpoint on the blockchain, it is not a person who pays the transaction fees, but an address. In the context of the blockchain, the sender's address whose private key signed the message pays the fees. For instance, in the case of a registration message, it is the public address for registration. For example, for a registration message with the private key of the registration address signing the message, it is the amount of Ethers attached to the public registration address that will pay the transaction fees. In order to pay transaction fees, it is technically necessary to supply the cryptocurrencies associated with the addresses that require them.

Regarding how to send cryptocurrencies to a public address, for an address (e.g., address 1) to hold cryptocurrencies, it is sufficient for another address (e.g., address 2) to send them. Suppose address 2 holds 3 ethers. To transfer 2 ethers to address 1, it is sufficient to send a message to the blockchain that is sealed with the private key of address 2, specifying "Transfer 2 ethers from address 2 to address 1". The blockchain records this transfer of cryptocurrencies and remembers that address 1 now has 2 ethers and that address 2 only has one ether left.

The disclosed embodiments can set up provisioning addresses and automated management of these transaction fees through service 305. In service 305, there can be created one or several addresses that are referred to as provisioning addresses. These addresses can be provided with cryptocurrencies.

Service 305 verifies that the addresses signing messages intended for the smart contract and the addresses signing messages for deploying the smart contract have sufficient cryptocurrencies to send messages on the blockchain. If this is not the case, service 305 sends a message, sealed with one of the provisioning addresses' keys, to the blockchain. This message requests the transfer of a certain amount of cryptocurrencies from the provisioning address (whose seal is affixed to the message) to the addresses that do not have sufficient cryptocurrencies to send messages to the smart contract or send deployment messages to the blockchain.

Example Computer/Computer Systems

Figure 10:
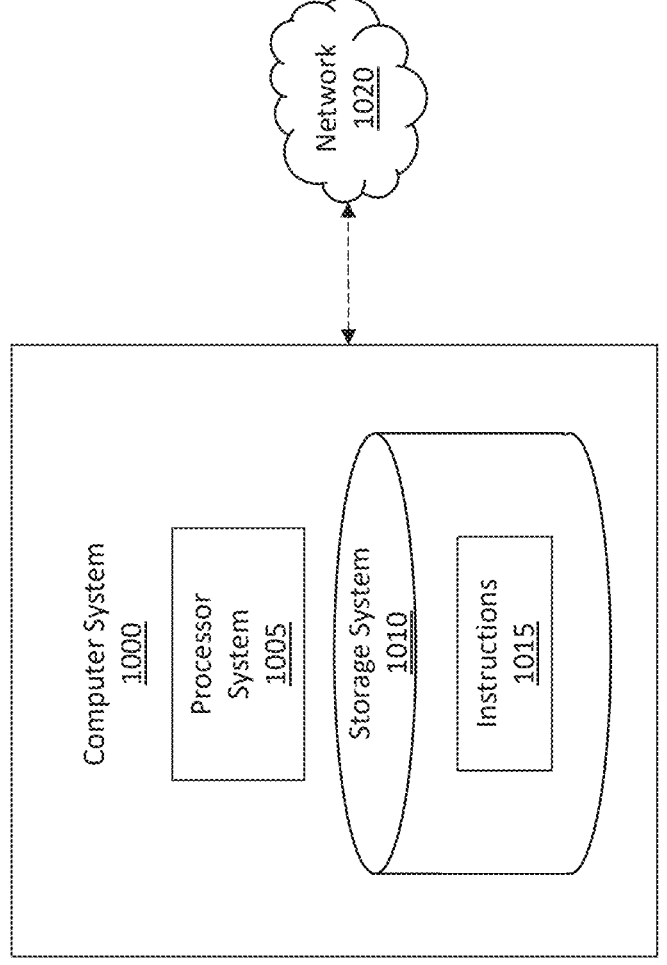
FIG. 10 illustrates an example computing system that can be configured to perform any of the disclosed operations.

Attention will now be directed to FIG. 10 which illustrates an example computer system 1000 that may include and/or be used to perform any of the operations described herein. Computer system can be implemented within the architecture 300 of FIG. 3. Computer system can also implement service 305 or smart contract 310.

Computer system 1000 may take various different forms. For example, computer system 1000 may be embodied as a tablet, a desktop, a laptop, a mobile device, or a standalone device, such as those described throughout this disclosure. Computer system 1000 may also be a distributed system that includes one or more connected computing components/ devices that are in communication with computer system 1000.

In its most basic configuration, computer system 1000 includes various different components. FIG. 10 shows that computer system 1000 includes a processor system 1005 comprising one or more processor(s) (aka a "hardware processing unit") and a storage system 1010.

Regarding the processor(s) of the processor system 1005, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," "smart contract," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

Storage system 1010 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage system 1010 is shown as including executable instructions 1015. The executable instructions 1015 represent instructions that are executable by the processor(s) of computer system 1000 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1020. For example, computer system 1000 can communicate with any number devices or cloud services to obtain or process data. In some cases, network 1020 may itself be a cloud network. Furthermore, computer system 1000 may also be connected through one or more wired or wireless networks to remote/ separate computer systems(s) that are configured to perform any of the processing described with regard to computer system 1000.

A "network," like network 1020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Figure 11:
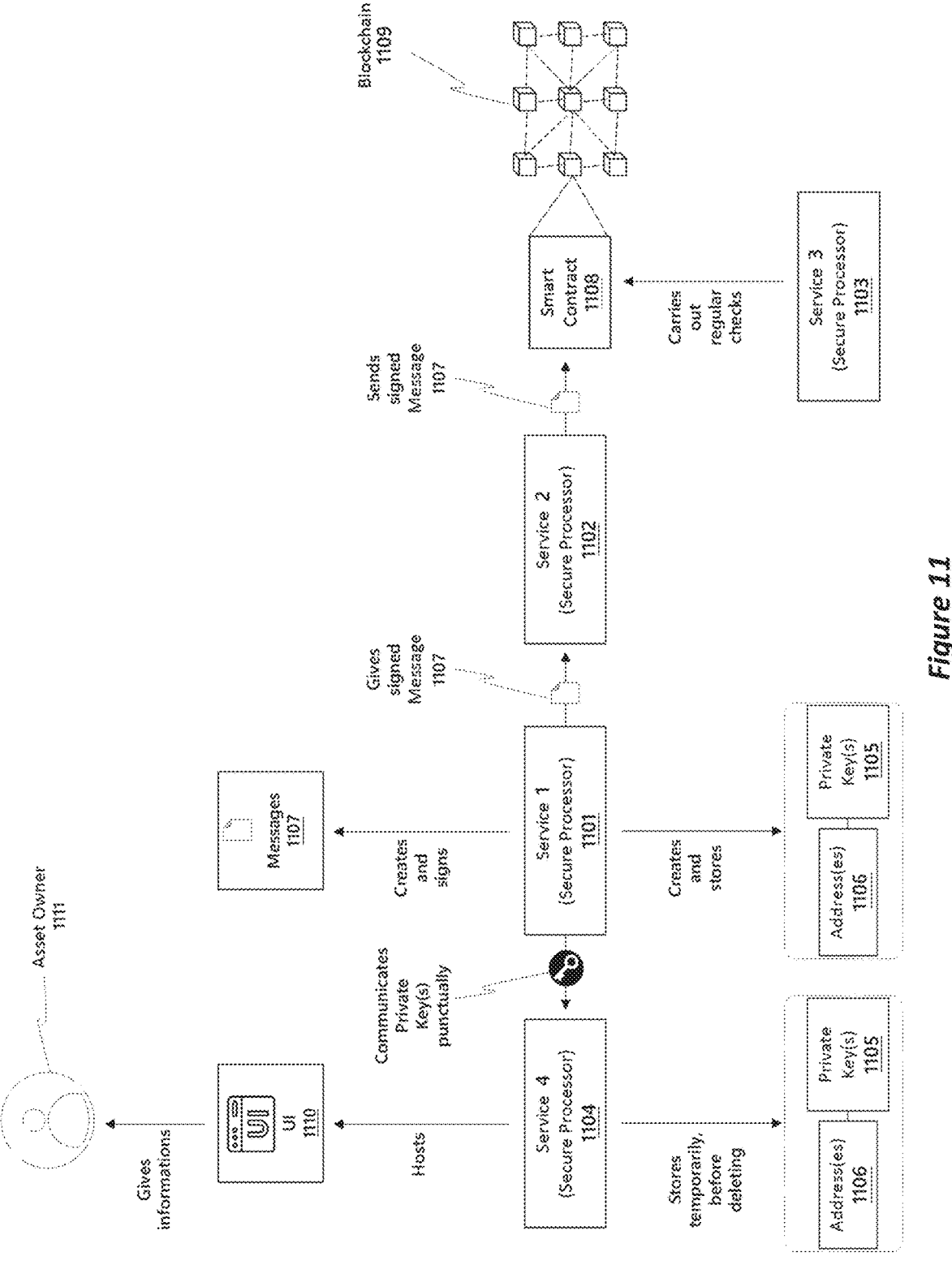
FIG. 11 shows another example computing architecture in which the disclosed principles can be employed.

There are cases where the functions of service 305 can be performed by several physical components that can be local, cloud-based, or a hybrid. One example configuration is a security configuration and is illustrated in FIG. 11. Referring to FIG. 11, service 1 1101 (e.g., not connected to the internet or a blockchain node) is responsible for generating private keys 1105 (and therefore public addresses 1106), storing them, and constructing and signing messages 1107. Service 1 1101 then transmits these messages to service 2 1102.

Service 2 1102) (e.g., connected to a blockchain node 1109) is responsible for sending messages 1107 to the smart contract 1108 (potentially multiple smart contracts) and deploying the smart contract via a blockchain node.

Service 3 1103 (e.g., connected to a blockchain node) is responsible for performing regular state checks on the smart contract 1108 (e.g., logging collection) by querying, for example a blockchain node.

Service 4 1104 (e.g., connected to the internet) hosts the UI 1110 of the system and receives occasionally the key of the current work address from service 1 1101 on a smart contract so that an asset owner 1111 can view the key. Service 4 1104 stores this key only for its validity period and deletes it from its memory afterwards. A possibility is that service 4 1104 does not store all the keys, but only the currently active keys of the changeable asset addresses.

Figure 12:
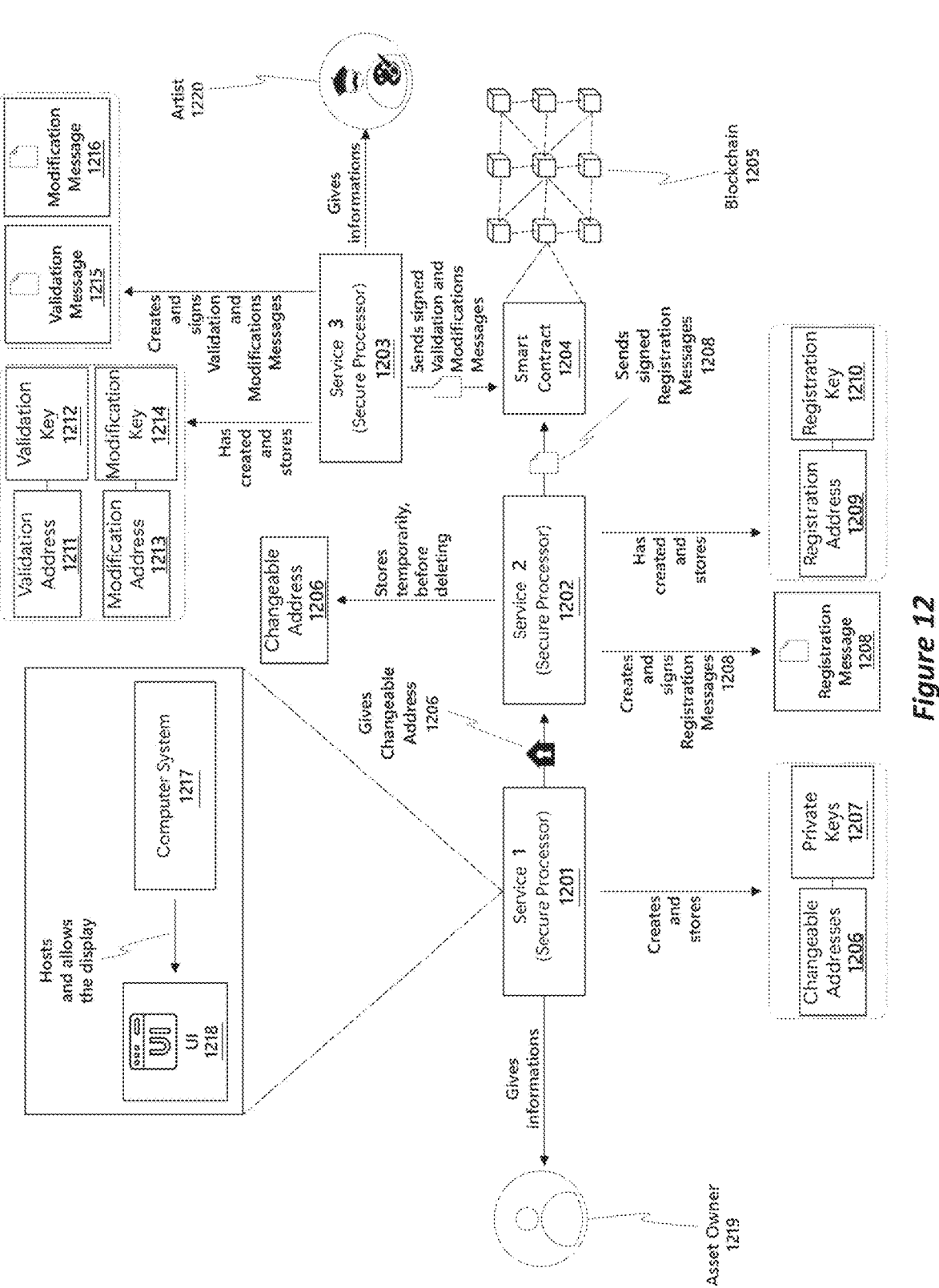
FIG. 12 shows another example computing architecture in which the disclosed principles can be employed.

A second example configuration is a decentralized configuration and is illustrated in FIG. 12. An asset 1219 (e.g., "collector") can keep at home a box. Service 1 1201 (which could be a micro-computer 1217) generates regularly a private key 1206 and its associated public address 1207 (i.e. the changeable asset address). The asset owner 1219 can thus consult the private key of the changeable asset address directly via the interface 1218 of their box and generate proofs of ownership with their box.

The changeable address can be communicated to the smart contract in various ways. One possibility is that service 1 1201 sends the changeable address to a second service 2 1202. Service 2 1202 creates a registration message 1208 containing this public address 1206, signs this message, and sends it then to the smart contract 1204 deployed in the blockchain 1205.

Service 2 1202 stores the registration key 1210 that it is the only one to know as well as the registration address 1209. Therefore, the addresses of the artwork 1206 are updated on the smart contract 1204.

Service 3 1203 (corresponding to the artist/creator) can exist in addition to the two other services. Service 3 1203 stores the key and the validation address along with the key and modification address, as shown by modification address 1213, modification key 1214, validation address 1211, and validation key 1212.

Service 3 1203 sends the modification messages 1216 to the smart contract 1204. Via the user interface, service 3 1203 could allow generating proofs of original conception and triggering the sending of validation messages 1215 signed by the validation key to the smart contract 1204. Service 3 1203 is provided to the artist 1220.

To recap, the recording message allows one to register the address of the work in the storage space of the smart contract. The modification message permits placing this address in the "changeable address" field in the storage space of the smart contract.

The disclosed embodiments can be implemented in numerous different ways, as described in the various different clauses recited below.

Clause 1. A method for enhancing privacy measures for ownership data associated with an asset that is managed by a smart contract residing in a blockchain, said method being implemented by a service and comprising: generating a smart contract for an asset, wherein: the smart contract is structured to include a storage space that will be publicly visible when the smart contract resides in a blockchain, the storage space is structured to include a public address field comprising a first public address value, and the first public address value is associated with a first private key that is usable to generate a proof of ownership of the asset, deploying the smart contract to the blockchain; after the smart contract is deployed to the blockchain, generating a second private key; using the second private key to generate a second public address value; and despite a current owner of the asset not changing such that no transactions involving the asset are performed, transmitting a message to the smart contract, wherein said transmitting operates as a trigger to cause the smart contract to replace the first public address value in the public address field with the second public address value.

Clause 2. The method of any of the preceding clauses, wherein replacing public address values in the public address field is performed in accordance with a periodic rate.

Clause 3. The method of any of the preceding clauses, wherein replacing public address values in the public address field is performed in accordance with an aperiodic rate.

Clause 4. The method of any of the preceding clauses, wherein replacing public address values in the public address field is performed in accordance with a randomly selected rate.

Clause 5. The method of any of the preceding clauses, wherein replacing public address values in the public address field is performed in accordance with a predetermined rate.

Clause 6. The method of any of the preceding clauses, wherein replacing public address values in the public address field is performed in accordance with a periodic rate, and wherein the method further includes: detecting a transfer of ownership from the current owner to a second owner, wherein the transfer of ownership occurs after the first public address value is replaced by the second public address value; delaying replacing the second public address value with a third public address value until such time as a current validity duration for the second public address value elapses; in response to the current validity duration elapsing, triggering replacement of the second public address value in the public address field of the smart contract with the third public address value.

Clause 7. The method of any of the preceding clauses, wherein replacing public address values in the public address field is performed in accordance with a randomly selected aperiodic rate, and wherein the method further includes: detecting a transfer of ownership from the current owner to a second owner, wherein the transfer of ownership occurs after the first public address value is replaced by the second public address value; triggering replacement of the second public address value in the public address field of the smart contract with a third public address value; and after a randomly selected amount of time has elapsed since the second public address value was replaced by the third public address value, replacing the third public address value with a fourth public address value despite the second owner retaining ownership of the asset.

Clause 8. The method of any of the preceding clauses, wherein the storage space is further structured to include an asset address field comprising an asset address that is unchanging and that identifies the asset.

Clause 9. The method of any of the preceding clauses, wherein the storage space is further structured to include a validation address field comprising a validation address that is unchanging and that identifies a creator of the asset.

Clause 10. The method of any of the preceding clauses, wherein the asset is a digital asset.

Clause 11. The method of any of the preceding clauses, wherein the asset is a physical asset.

Clause 12. A computer system comprising: a processor system; and a storage system comprising instructions that are executable by the processor system to cause the computer system to: generate a smart contract for an asset, wherein: the smart contract is structured to include a storage space that will be publicly visible when the smart contract resides in a blockchain, the storage space is structured to include a public address field comprising a first public address value, and the first public address value is associated with a first private key that is usable to generate a proof of ownership of the asset, deploying the smart contract to the blockchain; after the smart contract is deployed to the blockchain, generate a second private key; use the second private key to generate a second public address value; and despite a current owner of the asset not changing such that no transactions involving the asset are performed, transmit the second public address value to the smart contract, wherein said transmitting operates as a trigger to cause the smart contract to replace the first public address value in the public address field with the second public address value.

Clause 13. The computer system of any of the preceding clauses, wherein the instructions are further executable to cause the computer system to: display a user interface (UI) for the current owner of the asset, wherein a layout of the UI is structured to include the following: a first UI field identifying an asset address that uniquely identifies the asset; a second UI field identifying a validation address that uniquely identifies a creator of the asset; a third UI field identifying the second public address value; and a fourth UI field identifying the second private key.

Clause 14. The computer system of any of the preceding clauses, wherein the layout of the UI is further structured to include the following: a validity period for the second public address value, the validity period reflecting an amount of time remaining that the second public address value will be valid, wherein, when the amount of time remaining elapses, the second public address value will be replaced by a third public address value.

Clause 15. The computer system of any of the preceding clauses, wherein the layout of the UI is further structured to include the following: a validity period for the second private key, the validity period reflecting an amount of time remaining that the second private key will be valid, wherein, when the amount of time remaining elapses, the second private key will be replaced by a third private key.

Clause 16. The computer system of any of the preceding clauses, wherein the layout of the UI is further structured to include a fifth UI field that, when selected, triggers generation of a third private key and a third public address value and that triggers replacement of the second public address value in the public address field of the storage space with the third public address value.

Clause 17. The computer system of any of the preceding clauses, wherein the layout of the UI is further structured to include a sixth UI field that, when selected, defines a period at which new private keys and new public address values are to be generated and at which the public address field in the storage space of the smart contract is to be updated.

Clause 18. A method for enhancing privacy measures for ownership data associated with an asset that is managed by a smart contract residing in a blockchain, said method being implemented by a service and comprising: generating a smart contract for an asset, wherein: the smart contract is structured to include a storage space that will be publicly visible when the smart contract resides in a blockchain, the storage space is structured to include a public address field comprising a first public address value, and the first public address value is associated with a first private key that is usable to generate a proof of ownership of the asset, deploying the smart contract to the blockchain; after the smart contract is deployed to the blockchain, generating a second private key, wherein new private keys, including the second private key, are generated in response to occurrence of a timing condition; using the second private key to generate a second public address value; despite a current owner of the asset not changing such that no transactions involving the asset are performed, transmitting a message to the smart contract, wherein said transmitting operates as a trigger to cause the smart contract to replace the first public address value in the public address field with the second public address value; detecting a transfer of ownership from the current owner to a second owner, wherein the transfer of ownership occurs after the first public address value is replaced by the second public address value; and delaying triggering replacement of the second public address value in the public address field of the smart contract with a third public address value until the timing condition is detected.

Clause 19. The method of any of the preceding clauses, wherein the timing condition is a determined periodic rate at which the new private keys are generated.

Clause 20. The method of any of the preceding clauses, wherein the timing condition is a determined periodic rate at which the new private keys are generated, the periodic rate being a minimum of 60 minutes such that no new private key is generated until at least 60 minutes have elapsed since generation of a previous new private key.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for enhancing privacy measures for ownership data associated with an asset that is managed by a smart contract residing in a blockchain, said method being implemented by a service and comprising:

generating a smart contract for an asset, wherein:

the smart contract is structured to include a storage space that will be publicly visible when the smart contract resides in a blockchain, the storage space is structured to include a public address field comprising a first public address value, and the first public address value is associated with a first private key that is usable to generate a proof of ownership of the asset, deploying the smart contract to the blockchain;

after the smart contract is deployed to the blockchain, generating a second private key;

using the second private key to generate a second public address value;

despite a current owner of the asset not changing such that no transactions involving the asset are performed, transmitting a message to the smart contract, wherein said transmitting operates as a trigger to cause the smart contract to replace the first public address value in the public address field with the second public address value, wherein replacing public address values in the public address field is performed in accordance with at least one of: a periodic rate, a predetermined rate, a randomly selected rate, or an aperiodic rate;

detecting a transfer of ownership from the current owner to a second owner, wherein the transfer of ownership occurs after the first public address value is replaced by the second public address value;

delaying replacing the second public address value with a third public address value until such time as a current validity duration for the second public address value elapses; and in response to the current validity duration elapsing, triggering replacement of the second public address value in the public address field of the smart contract with the third public address value.

2. The method of claim 1, wherein replacing public address values in the public address field is performed in accordance with the periodic rate.

3. The method of claim 1, wherein replacing public address values in the public address field is performed in accordance with the aperiodic rate.

4. The method of claim 1, wherein replacing public address values in the public address field is performed in accordance with the randomly selected rate.

5. The method of claim 1, wherein replacing public address values in the public address field is performed in accordance with the predetermined rate.

6. The method of claim 1, wherein the storage space is further structured to include an asset address field comprising an asset address that is unchanging and that identifies the asset.

7. The method of claim 1, wherein the storage space is further structured to include a validation address field comprising a validation address that is unchanging and that identifies a creator of the asset.

8. The method of claim 1, wherein the asset is a digital asset.

9. The method of claim 1, wherein the asset is a physical asset.

10. A computer system comprising:

a processor system; and a storage system comprising instructions that are executable by the processor system to cause the computer system to:

generate a smart contract for an asset, wherein:

the smart contract is structured to include a storage space that will be publicly visible when the smart contract resides in a blockchain, the storage space is structured to include a public address field comprising a first public address value, and the first public address value is associated with a first private key that is usable to generate a proof of ownership of the asset, deploy the smart contract to the blockchain;

after the smart contract is deployed to the blockchain, generate a second private key;

use the second private key to generate a second public address value; and despite a current owner of the asset not changing such that no transactions involving the asset are performed, transmit a message to the smart contract, wherein said transmitting operates as a trigger to cause the smart contract to replace the first public address value in the public address field with the second public address value, wherein replacing public address values in the public address field is performed in accordance with at least one of: a periodic rate, a predetermined rate, a randomly selected rate, or an aperiodic rate;

detect a transfer of ownership from the current owner to a second owner, wherein the transfer of ownership occurs after the first public address value is replaced by the second public address value;

delay replacing the second public address value with a third public address value until such time as a current validity duration for the second public address value elapses; and in response to the current validity duration elapsing, trigger replacement of the second public address value in the public address field of the smart contract with the third public address value.

11. The computer system of claim 10, wherein the instructions are further executable to cause the computer system to:

display a user interface (UI) for the current owner of the asset, wherein a layout of the UI is structured to include the following:

a first UI field identifying an asset address that uniquely identifies the asset;

a second UI field identifying a validation address that uniquely identifies a creator of the asset;

a third UI field identifying the second public address value; and a fourth UI field identifying the second private key.

12. The computer system of claim 11, wherein the layout of the UI is further structured to include the following:

a validity period for the second public address value, the validity period reflecting an amount of time remaining that the second public address value will be valid, wherein, when the amount of time remaining elapses, the second public address value will be replaced by a third public address value.

13. The computer system of claim 11, wherein the layout of the UI is further structured to include the following:

a validity period for the second private key, the validity period reflecting an amount of time remaining that the second private key will be valid, wherein, when the amount of time remaining elapses, the second private key will be replaced by a third private key.

14. The computer system of claim 11, wherein the layout of the UI is further structured to include a fifth UI field that, when selected, triggers generation of a third private key and a third public address value and that triggers replacement of the second public address value in the public address field of the storage space with the third public address value.

15. The computer system of claim 14, wherein the layout of the UI is further structured to include a sixth UI field that, when selected, defines a period at which new private keys and new public address values are to be generated and at which the public address field in the storage space of the smart contract is to be updated.

16. A method for enhancing privacy measures for ownership data associated with an asset that is managed by a smart contract residing in a blockchain, said method being implemented by a service and comprising:

generating a smart contract for an asset, wherein:
the smart contract is structured to include a storage space that will be publicly visible when the smart contract resides in a blockchain,
the storage space is structured to include a public address field comprising a first public address value, and
the first public address value is associated with a first private key that is usable to generate a proof of ownership of the asset,
deploying the smart contract to the blockchain;
after the smart contract is deployed to the blockchain, generating a second private key, wherein new private keys, including the second private key, are generated in response to occurrence of a timing condition;
using the second private key to generate a second public address value;
despite a current owner of the asset not changing such that no transactions involving the asset are performed, transmitting a message to the smart contract, wherein said transmitting operates as a trigger to cause the smart contract to replace the first public address value in the public address field with the second public address value, wherein replacing public address values in the public address field is performed in accordance with at least one of: a periodic rate, a predetermined rate, a randomly selected rate, or an aperiodic rate;

detecting a transfer of ownership from the current owner to a second owner, wherein the transfer of ownership occurs after the first public address value is replaced by the second public address value;

delaying triggering replacement of the second public address value in the public address field of the smart contract with a third public address value until the timing condition is detected; and in response to the timing condition being detected, triggering replacement of the second public address value in the public address field of the smart contract with the third public address value.

17. The method of claim 16, wherein the timing condition is a associated with the periodic rate, which governs when the new private keys are generated.

18. The method of claim 16, wherein the timing condition is associated with the periodic rate, which governs when the new private keys are generated, the periodic rate being a minimum of 60 minutes such that no new private key is generated until at least 60 minutes have elapsed since generation of a previous new private key.

19. The method of claim 16, wherein replacing public address values in the public address field is performed in accordance with the predetermined rate or the randomly selected rate.

20. The method of claim 16, wherein replacing public address values in the public address field is performed in accordance with the randomly selected rate or the aperiodic rate.

* * * * *